United States Patent
Kawai et al.

[11] Patent Number: 5,943,143
[45] Date of Patent: Aug. 24, 1999

[54] IMAGE PROCESSING SYSTEM HAVING COLOR ADJUSTING FEATURES

[75] Inventors: Takashi Kawai, Yokohama; Kenichi Ohta, Kawasaki; Akira Negishi, Fujisawa, all of Japan

[73] Assignee: Canon Kabushiki Kaisha, Tokyo, Japan

[21] Appl. No.: 08/262,971

[22] Filed: Jun. 21, 1994

[30] Foreign Application Priority Data

Jun. 22, 1993 [JP] Japan .................................. 5-150258
Jan. 12, 1994 [JP] Japan .................................. 6-001559

[51] Int. Cl.⁶ .............................. H04N 1/56; H04N 1/54
[52] U.S. Cl. ...................................... 358/520; 358/515
[58] Field of Search .................................. 358/515–520; 395/109

[56] References Cited

U.S. PATENT DOCUMENTS

| | | | |
|---|---|---|---|
| 4,763,186 | 8/1988 | Belmares-Sarabia et al. | 358/520 |
| 5,012,299 | 4/1991 | Sawamura et al. | 358/520 |
| 5,333,070 | 7/1994 | Ichikawa | 358/520 |
| 5,333,243 | 7/1994 | Best et al. | 395/109 |
| 5,371,609 | 12/1994 | Suzuki et al. | 358/448 |
| 5,436,739 | 7/1995 | Imao et al. | 358/520 |
| 5,485,284 | 1/1996 | Shono et al. | 358/520 |

FOREIGN PATENT DOCUMENTS 5-63968    3/1993    Japan .

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

An object of this invention is to improve the operability of color adjustment by using a simple hardware arrangement which performs only a matrix arithmetic operation having matrix coefficients properly determined in accordance with adjustment amounts designated from an operation unit for adjusting three variables as lightness, saturation, and hue. In the constitution of this invention, an image input unit inputs a color input signal, and a color conversion unit extracts the minimum value from the input color signal for each pixel, obtaining a difference signal of the input color signal and the extracted minimum value signal. The obtained difference signal is converted in matrix in accordance with matrix conversion coefficients generated by a matrix conversion coefficient unit in correspondence with the adjustment amounts of the adjustment items of an operation unit for adjusting three variables as lightness, hue, and saturation.

16 Claims, 18 Drawing Sheets

FIG. 10

| SECOND BIT | FIRST BIT | 0TH BIT | RELATIONSHIP OF A,B,C IN SIZE |
|---|---|---|---|
| 0 | 0 | 0 | A=B=C |
| 0 | 0 | 1 | — |
| 0 | 1 | 0 | B≦A≦C (B<C) |
| 0 | 1 | 1 | A<B≦C |
| 1 | 0 | 0 | C≦B≦A (C<A) |
| 1 | 0 | 1 | C≦A<B |
| 1 | 1 | 0 | B<C<A |
| 1 | 1 | 1 | A<C<B |

(NOTE) NO OUTPUT OF SELK = "001"

FIG. 18A
FIG. 18B
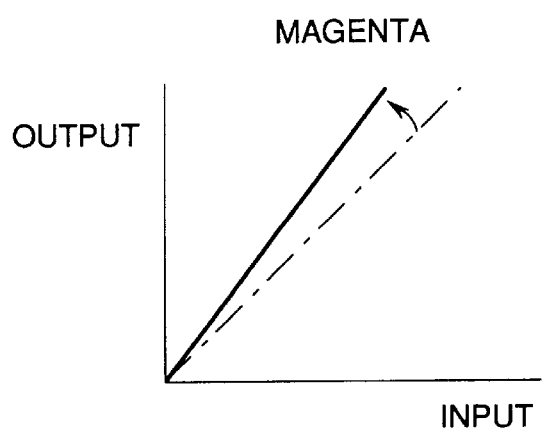
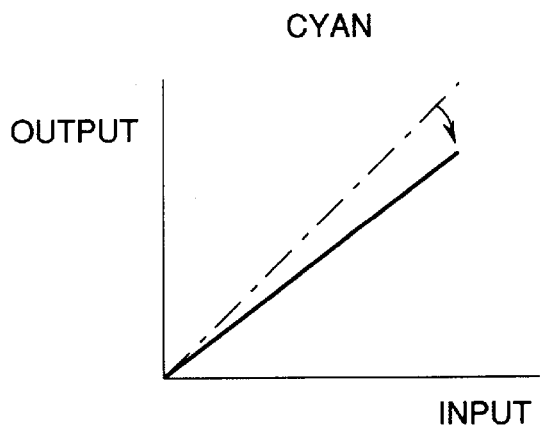

IMAGE PROCESSING SYSTEM HAVING COLOR ADJUSTING FEATURES

BACKGROUND OF THE INVENTION

1. Field of the Invention

The present invention relates to an image processing method and apparatus for receiving a color image original in the form of R, G, and B color-separated signals, performing predetermined arithmetic processing, such as matrix conversion, for the input image signals, and outputting the result of the processing.

2. Related Background Art

Generally, a color copying machine desirably reproduces colors, gradation, and the like as faithful as possible in a hard copy output image with respect to those of an original image. In effect, however, problems are pointed out in the following three points because there is the difference between the color separation of an original image and the color reproduction range of a hard copy output device, and countermeasures against these problems have been proposed.

(1) In an original having a background portion (which is normally white), called a surface, in addition to an original image, it is desirable that this surface be reproduced in a color as white as possible (i.e., be not printed out). Additionally, even if the surface color is removed, color reproduction is desirably performed without degrading the color reproducibility of other colors. As a countermeasure against this, a method has been proposed by which the surface color is removed by detecting the surface level and performing nonlinear conversion for R, G, and B signals, as in Japanese Laid-Open Patent Application No. 5-63968.

(2) In an original in which the color distribution of an original image falls outside the color reproduction range of a hard copy output device, the gradation of that portion is degraded. In such an original, it is desirable to map the color distribution of an original image within the color reproduction range of a hard copy output device. In this connection, U.S. Ser. No. 38,898 (filing date: Mar. 29, 1993) proposes a method in which the color distribution of an original image is detected, and matrix conversion is performed in accordance with the detected color distribution to map the color distribution within the color reproduction range.

(3) A color copying machine compresses the expected dynamic range of an input image by converting the dynamic range in gradation. However, if an original image has a range wider than the expected dynamic range, the gradation is degraded in a dark portion. As a countermeasure against this, there is a method by which the compression ratio of the dynamic range is adjusted by modifying conversion expressions by using a logarithm conversion circuit in luminance-density conversion processing for an image signal.

A color copying machine includes an operation unit in addition to the above arrangement, so an operator can perform various color adjusting operations he or she desires by using this operation unit. For example, when an operator wishes to obtain a more reddish output image, he or she increases the M (magenta) density and decreases the C (cyan) density by operating an operation unit of a color copying machine as illustrated in FIG. 17. That is, in accordance with the setting in this operation unit, a color gradation modification circuit performs gamma conversion as in FIGS. 18A and 18B (in each of which a chain double-dashed line indicates a standard value, $\gamma=1$). Consequently, the gamma curve of magenta rises to increase the magenta density as a whole, and the gamma curve of cyan falls to decrease the cyan density, thereby increasing reddishness in total.

The above countermeasures for effecting faithful color reproduction, however, have been separately proposed against the different problems. Therefore, if the above problems appear at the same time in practical situations (e.g., if the outlying color space of an original image and the batter of a dark level exist simultaneously), the signal conversion for a countermeasure against one problem produces an influence on the signal conversion for a countermeasure against the other, making it impossible to sufficiently achieve the respective effects of these countermeasures.

In addition, there are other problems in respect of the configuration of hardware. That is, the locations of the individual countermeasures are scattered at a plurality of points in an image processing signal system, resulting in increases in size, manufacturing cost, and difficulty in design of the circuit.

Generally, color adjustment is performed on the basis of a color sample image by using lightness, saturation, and hue as variables in many instances. As an example, the adjustment is to "increase the vividness (saturation) at a constant brightness (lightness) without changing the hue (at a constant hue)".

In any color adjusting method of the above conventional examples, however, the adjustment amounts of the lightness, the saturation, and the hue must be replaced with the combination of the color density adjustment amounts of Y, M, C, and Bk, as in FIG. 17. This makes desired color adjustment very difficult.

In addition, some image processing apparatuses employ a color adjusting method by which R, G, and B signals are converted in coordinates in a CIE-$L^*a^*b^*$ uniform color space to perform color conversion in the $L^*a^*b^*$ space, and then returned to the R, G, and B signals. However, the conversion from the RGB signal to the $L^*a^*b^*$ signal involves processing containing nonlinear arithmetic operations. Therefore, in an apparatus, such as a color copying machine, in which an enormous quantity of data (pixels) is processed at a high speed in real time, the load on the apparatus is increased to result in an increased size of hardware.

Furthermore, in the method of adjusting the color densities of Y, M, C, and Bk as in the above conventional examples, if the magenta density is increased and the cyan density is decreased in the adjustment for increasing reddishness, a red portion of an image becomes more reddish. However, green as a mixed color of cyan and yellow is rendered yellowish if the cyan density is decreased; that is, an undesirable color change takes place as a side effect.

SUMMARY OF THE INVENTION

The present invention has been made in consideration of the above situations, and has as its object to perform surface level correction and color space compression simultaneously, thereby preventing these processes from affecting each other to satisfactorily achieve their respective effects.

To achieve the above object, the present invention provides an image processing apparatus comprising input means for inputting a color signal representing a color image, first detection means for detecting a surface level of the color image, second detection means for detecting a distribution of the color image in a predetermined color space, and color conversion means for color-converting the color signal in accordance with correction data based on the surface level and the color space distribution detected by the first and second detection means.

The present invention also provides an image processing apparatus, wherein an image signal is transferred dot-sequentially in the apparatus.

It is another object of the present invention to simultaneously perform dark level correction and color space compression to prevent these processes from affecting each other, thereby satisfactorily achieving their respective effects.

To achieve the above object, the present invention provides an image processing apparatus, wherein a new color signal generated by color conversion means has a value reflecting a color reproduction range of a connectable image output unit.

Alternatively, the present invention provides an image processing method comprising the input step of inputting a color signal representing a color image, the first detection step of detecting a surface level of the color image, the second detection step of detecting a distribution of the color image in a predetermined color space, and the color conversion step of color-converting the color signal in accordance with correction data based on the surface level and the color space distribution detected in the first and second detection steps.

It is still another object of the present invention to provide an image processing apparatus and method capable of easily obtaining a matrix conversion coefficient for performing matrix color conversion for a desired color.

To achieve the above object, the present invention provides an image processing apparatus, wherein adjustment items of setting means for three variables, lightness, hue, and saturation, are set for each of six primary colors, Y (yellow), M (magenta), C (cyan), R (red), G (green), and B (blue), and the six colors can be adjusted in lightness, hue, and saturation independently of each other.

Alternatively, the present invention provides an image processing method comprising the input step of inputting a color signal representing a color image, the first detection step of detecting a dark level of the color image, the second detection step of detecting a distribution of the color image in a predetermined color space, and the color conversion step of color-converting the color signal in accordance with correction data based on the dark level and the color space distribution detected in the first and second detection steps.

It is still another object of the present invention to provide an image processing apparatus and method capable of easily adjusting colors of interest while the adjustment amounts of these colors are visually monitored.

To achieve the above object, the present invention provides an image processing apparatus, wherein a predetermined color space as an object to be detected by second detection means is a color space of three signals obtained by converting input R, G, and B signals by raising the signals to the one-third power, and obtaining a linear weighted sum of the converted signals.

Alternatively, the present invention provides an image processing method comprising the input step of inputting a multicomponent color signal representing an image, the setting step of manually setting a plurality of adjustment amounts of at least two of three variables as lightness, hue, and saturation, for a reproduction color of an image to be output, and the matrix color conversion step of performing matrix color conversion for the multicomponent color signal by using a matrix conversion coefficient based on a plurality of the adjustment amounts set in the setting step.

It is still another object of the present invention to provide an image processing apparatus and method by which an increase in cost is decreased by decreasing the size of a circuit.

To achieve the above object, the present invention provides an image processing apparatus, wherein display means displays adjustment amounts in a color space represented substantially by a circle, in which an angle indicates a hue and a distance from a center indicates saturation.

Alternatively, the present invention provides an image processing method comprising the setting step of manually setting adjustment amounts of at least two of three variables as lightness, hue, and saturation, for a plurality of colors of an input multicomponent color signal representing an image, and the display step of simultaneously displaying the adjustment amounts set for a plurality of colors in the setting step.

Other objects and aspects of the invention will become apparent from the following detailed description taken in conjunction with the accompanying drawings and from the appended claims.

BRIEF DESCRIPTION OF THE DRAWINGS

FIG. 10 is a table showing an example of the definition of an output signal SELK from a non-zero term selector in FIG. 9;

FIGS. 18A and 18B are graphs showing the γ adjustment for magenta and cyan density signals based on a conventional color adjustment method.

DETAILED DESCRIPTION OF THE PREFERRED EMBODIMENTS

The first embodiment of the present invention will be described in detail below with reference to the accompanying drawings.

First Embodiment

Figure 1:
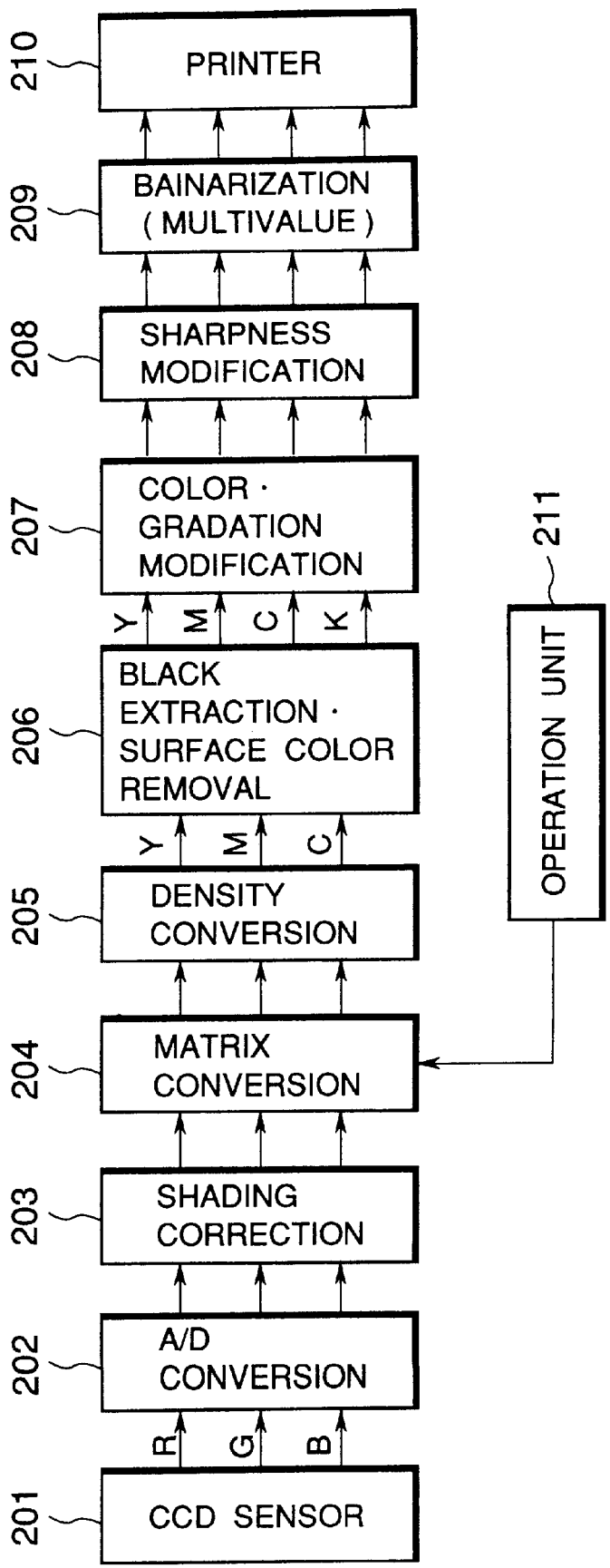
FIG. 1 is a block diagram showing the arrangement of a color copying machine according to one embodiment of the present invention.

FIG. 1 is a block diagram showing the arrangement of a color copying machine according to the first embodiment of the present invention.

In the arrangement of FIG. 1, R, G, and B luminance signals from a CCD sensor 201 are converted into respective corresponding digital signals by an A/D conversion circuit 202 and corrected in shading by a shading correction circuit 203. The resulting signals are then converted in matrix by a matrix conversion circuit 204, subjected to color conversion and color correction (to be described later), and transferred to a density conversion circuit 205.

The density conversion circuit 205 converts the input signals into density signals of Y (yellow), M (magenta), and C (cyan). A black extraction-surface color removal circuit 206 removes a surface color from these density signals, generating a K (black) signal. The Y, M, C, and K signals thus formed are transferred to a color gradation modification circuit 207. These signals are then modified in sharpness by a sharpness modification circuit 208, binarized by a binarization (multivalue) circuit 209, and printed (recorded) by a printer 210.

Note that an operation unit 211 is used to perform various input operations, and an input unit for designating color correction is also provided in this operation unit.

Figure 2:
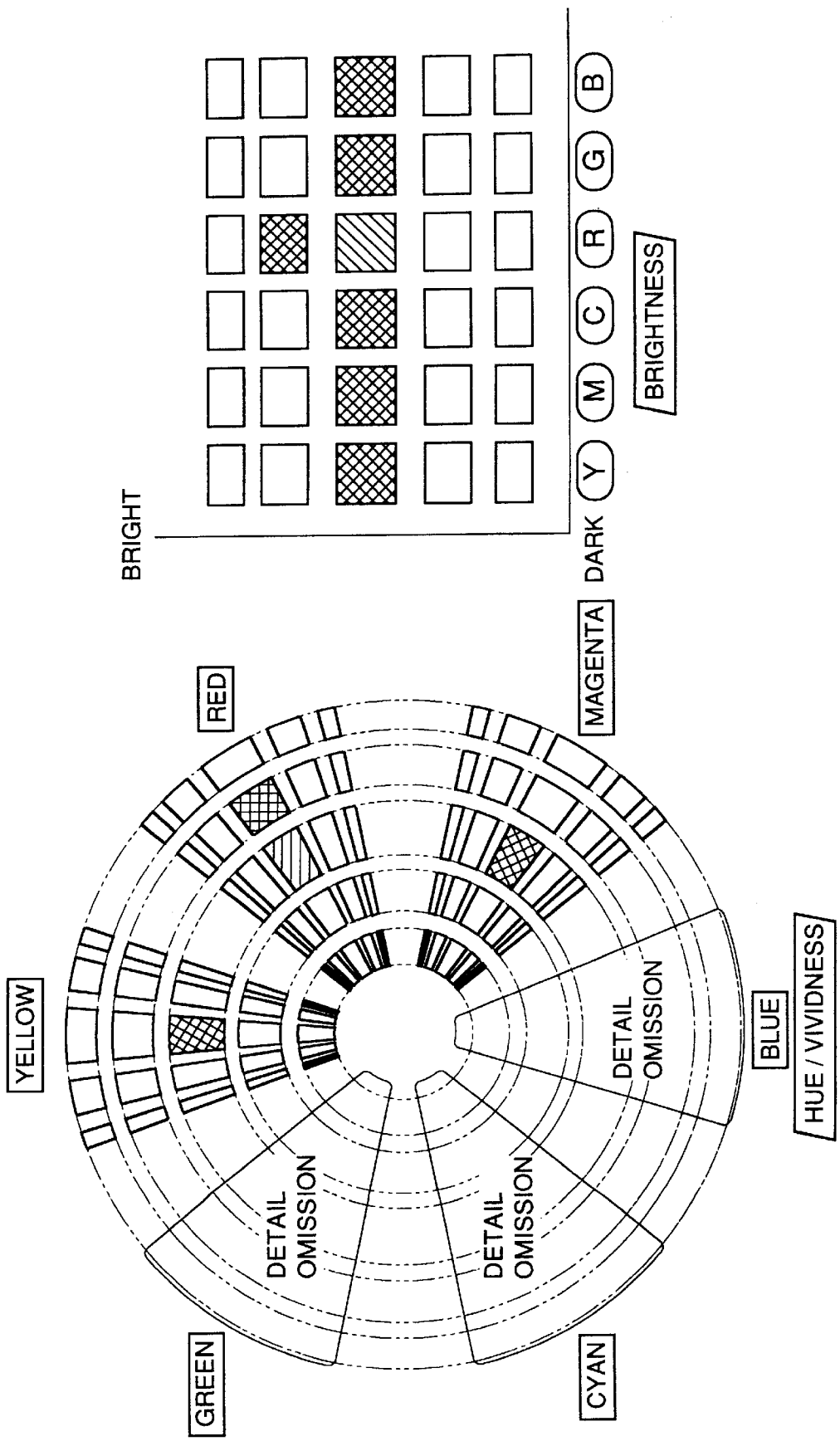
FIG. 2 is a view showing details of an example of an operation unit in FIG. 1.

FIG. 2 shows a detailed arrangement of this color correction designating unit of the operation unit 211. In this embodiment, color adjustment using this operation unit 211 is performed by adjusting three items as hue, saturation (vividness), and lightness (brightness). In the layout of the operation unit concerning the color adjustment illustrated in FIG. 2, the arrangements of green, cyan, and blue are identical with those of other colors in the unit for adjusting the hue and the saturation (vividness), so detailed indications thereof are omitted.

Referring to FIG. 2, the hue and the saturation are adjusted by using operation keys concentrically radiated on the left while visually monitoring the states of colors to be adjusted. In FIG. 2, the colors to be adjusted are six colors, i.e., yellow (Y), magenta (M), cyan (C), red (R), green (G), and blue (B). However, it is also possible to designate other colors as the colors to be adjusted.

This concentrically radiated arrangement of the operation keys of the operation unit is based upon a "uniform color space" coordinate system such as represented by a "Mansell notation system" or a "CIE-L*a*b* color space". In this arrangement, the circumferential direction of the concentric circle represents the hue circle, and its radiating direction represents the saturation.

FIG. 2 illustrates adjustment keys (adjustment amounts) in ±2 steps for the hue and in ±2 steps for the saturation centered at reference values (indicated by "hatched" keys in FIG. 2, and, if the set values are not altered, the values are indicated by "crosshatched" keys). It is of course preferable to increase the number of these adjustment steps.

In a default state, each central adjustment step is normally set as the reference value. The selected keys displayed on a liquid-crystal panel of the operation unit are inverted in the display state from other keys, i.e., displayed either negatively or positively or vice versa, so as to be seen easily. Referring to FIG. 2, unselected keys are positively displayed such as indicated by "☐" without hatching, and the selected keys indicated by "crosshatching" are negatively displayed.

If an operator wishes to "increase the vividness of red without changing its hue", he or she need only select, from the red adjustment keys, the "crosshatched" key which is an adjustment key arranged outward in the radiating direction from the value indicated by hatching, as the reference set value, while leaving other colors (Y, M, C, G, and B) at the reference values (indicated by "crosshatched" keys), as in FIG. 2.

If an operator wishes to "increase the vividness of red toward yellow", he or she need only select the adjustment key arranged one step (or two steps) toward yellow, instead of selecting the "crosshatched" adjustment key for red in FIG. 2.

On the other hand, adjustment for the lightness (brightness) is performed by operation keys arranged on the right of FIG. 2. FIG. 2 illustrates adjustment in ±2 steps centered at reference values (indicated by "hatched" keys, and if the set values are not changed, the values are indicated by "crosshatched" key). The adjustment for the lightness is also performed by the adjustment keys as in (Y, M, C, R, G, and B).

If an operator wishes to "increase the brightness of red", he or she need only select, from the red adjustment keys, the "crosshatched" adjustment key arranged upward from the reference value indicated by the "hatched" key, while leaving other colors at the reference values, as illustrated in FIG. 2.

In this fashion, the adjustment that is readily perceivable by intuition can be performed by the combination of the three variables as the lightness, saturation, and hue. As an example, the adjustment in FIG. 2 is to "increase the brightness and vividness of red without changing its hue" by using the lightness, saturation, and hue in total.

This adjustment is not limited to one color such as red. For example, it is also possible to set a finer color adjustment operation by the combination of the adjustments for the individual colors such as to "(1) increase the brightness and vividness of red without changing its hue, (2) increase the vividness of magenta without changing its hue and brightness, and (3) shift the hue of green toward blue without changing its lightness and saturation".

Furthermore, the adjusted states of the individual colors are displayed simultaneously during the above adjustment. Therefore, it is possible to adjust each color of interest in accordance with the adjusted state of that color.

The arrangement of a color signal conversion circuit for realizing the color adjustment of this embodiment designated by the operation unit 211 discussed above will be described below.

Figure 3:
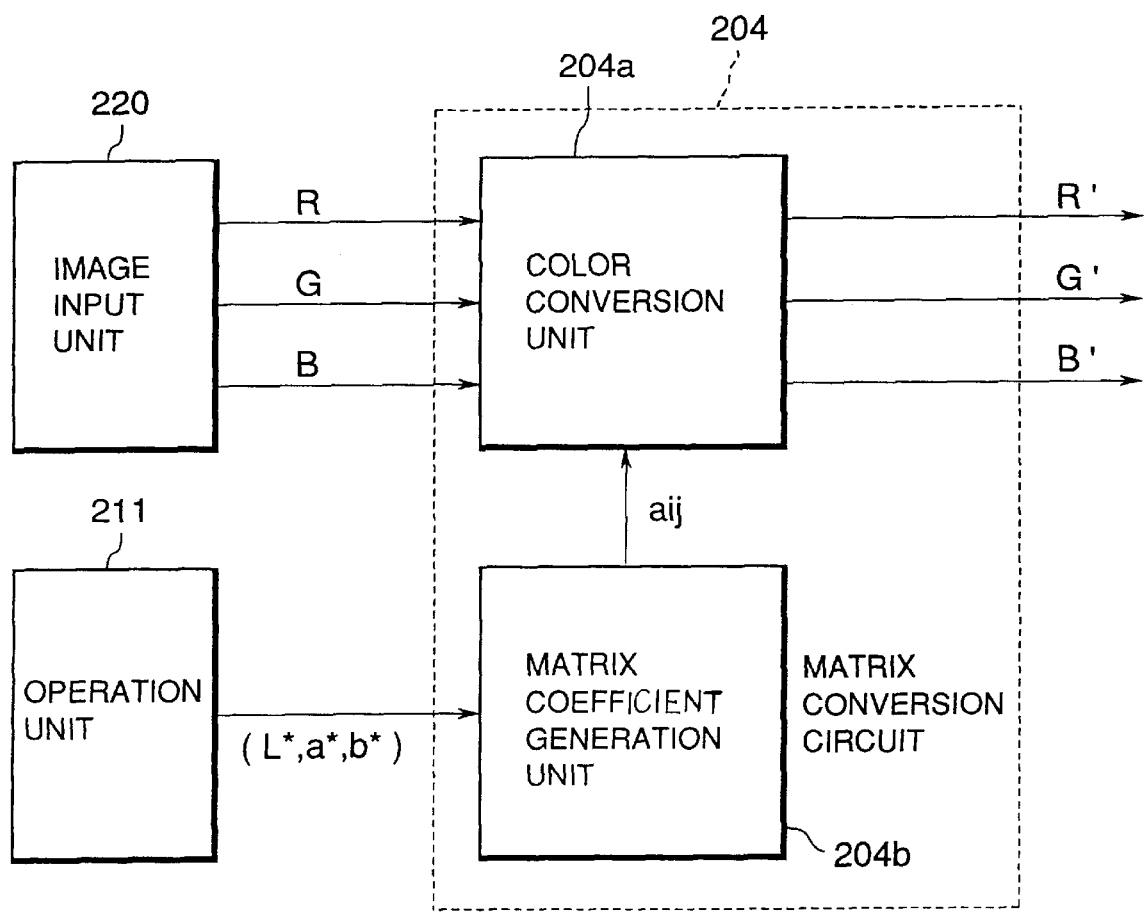
FIG. 3 is a block diagram showing the arrangement of a color adjustment unit of this embodiment.

FIG. 3 shows the arrangement of a portion for performing the color adjustment for R, G, and B color image signals. The R, G, and B color image signals from an image input unit 220 including the components from the CCD sensor 201 to the shading correction circuit 202 in FIG. 1 are applied to a color conversion unit 204*a* of the matrix conversion circuit 204. At the same time, the operation result from the operation unit 211 is applied to a matrix coefficient generation unit 204*b* of the matrix conversion circuit 204. That is, on the basis of the matrix coefficient generated in accordance with the designation from the operation unit 211, the color conversion unit 204*a* performs matrix conversion in which color space compression is performed for the input R, G, B color signals from the image input unit.

Assume that the color coordinate point of the reference set value is $(L^*_0 a^*_0 b^*_0)$, that the color coordinate point of an adjustment value (x) is $(L^*_i a^*_i b^*_i)$, and that the set color coordinate point of the adjusted color $(L^*_i a^*_i b^*_i)$ is $(L^{*'} a^{*'} b^{*'})$. The matrix conversion is executed in accordance with this set value, thereby performing the color adjustment.

The $(L^{*'} a^{*'} b^{*'})$ signal (or the corresponding signal) whose adjustment amount is determined by the operation unit 211 is supplied to the matrix coefficient generation unit 204b. The matrix coefficient generation unit 204b obtains $a_{ij}$ by the method to be described later. This $a_{ij}$ is applied to the color conversion unit 204a sketched in block-diagram form in FIG. 4, and in this way the coefficients are set. After setting the coefficients, the image input unit 220 outputs the R, G, and B color image signals. The color conversion unit 204a converts the colors of these color image signals to output adjusted colors R', G', and B'.

Figure 4:
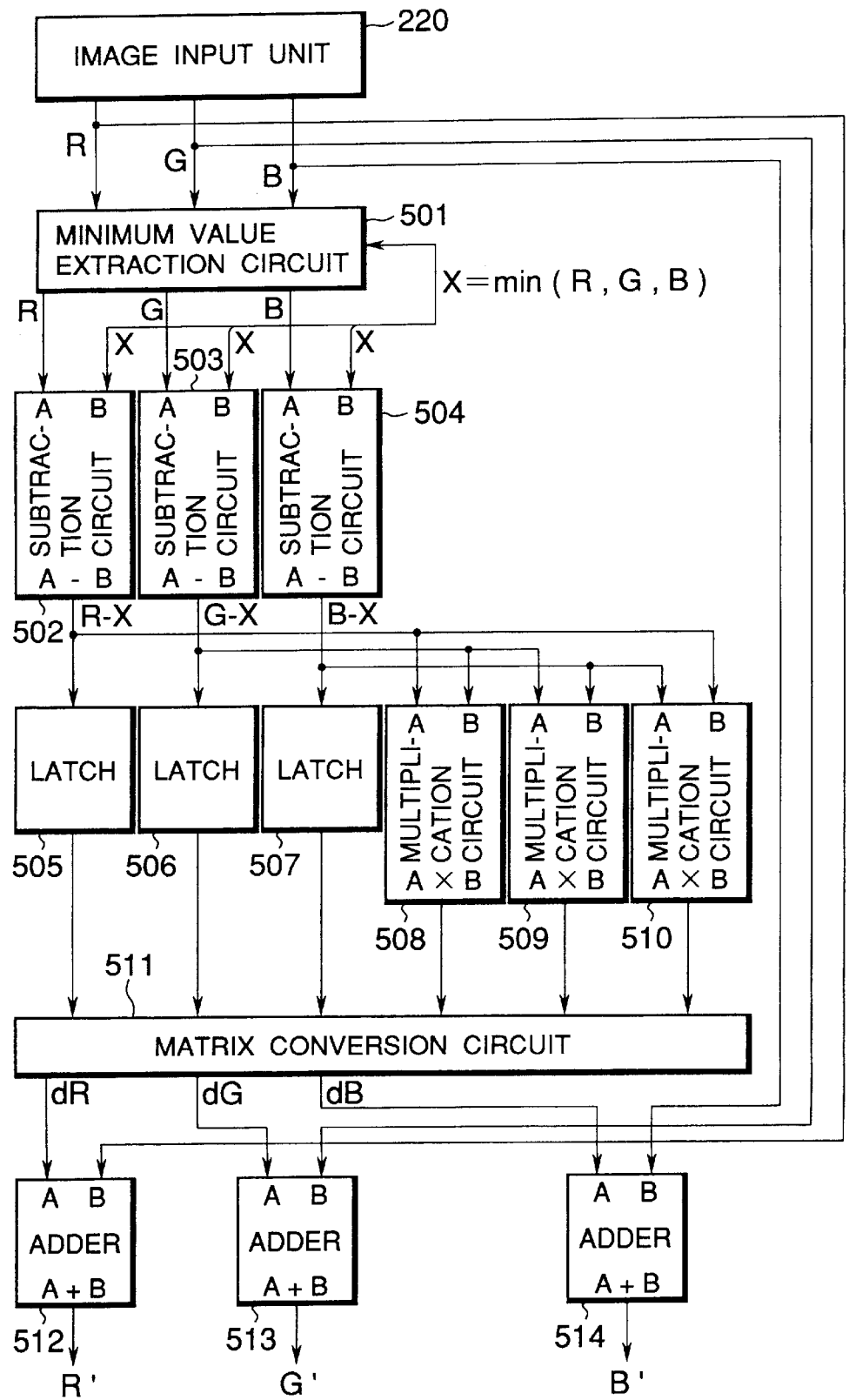
FIG. 4 is a block diagram showing a detailed arrangement of a color conversion unit in FIG. 3.

A detailed arrangement of this color conversion unit 204a is shown in FIG. 4. Referring to FIG. 4, a minimum value extraction circuit 501 extracts the minimum value from the R, G, and B image signals and outputs a minimum value signal X{min(R,G,B)}. Subtraction circuits 502, 503, and 504 calculate the differences between the input signals and the minimum value signal; that is, the subtraction circuits 502, 503, and 504 calculate and output R–X, G–X, and B–X, respectively.

Latches 505, 506, and 507 temporarily latch the outputs from the subtraction circuits 502, 503, and 504, respectively. Multiplication circuits 508, 509, and 510 calculate the terms of second degree of R–X, G–X, and B–X, respectively; that is, the multiplication circuits 508, 509, and 510 calculate and output (R–X)*(G–X), (G–X)*(B–X), and (B–X)*(R–X), respectively.

A matrix conversion circuit 511 performs matrix conversion for the six signal values obtained as described above. More specifically, the matrix conversion circuit 511 performs the arithmetic operation represented by equation (1) below and outputs dR, dG, and dB:

$$\begin{bmatrix} dR \\ dG \\ dB \end{bmatrix} = \begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \end{bmatrix} * \begin{bmatrix} R-X \\ G-X \\ B-X \\ (R-X)(G-X) \\ (G-X)(B-X) \\ (B-X)(R-X) \end{bmatrix} \quad (1)$$

The matrix conversion coefficients $a_{ij}$ used in the above equation are determined on the basis of the set value (adjustment amount) of the color adjustment mentioned above so that the color reproducibility and the gradation of a printer are improved. The method of determining the matrix conversion coefficients will be described in detail later.

Adders 512, 513, and 514 add dR, dG, and dB obtained by equation (1) above to the original R, G, and B signals and output color-separated signals R', G', and B' after the conversion:

$$\begin{bmatrix} R' \\ G' \\ B' \end{bmatrix} = \begin{bmatrix} R \\ G \\ B \end{bmatrix} + \begin{bmatrix} dR \\ dG \\ dB \end{bmatrix} \quad (2)$$

The method of obtaining the matrix conversion coefficients $a_{ij}$ of equation (1) above performed by the matrix coefficient generation unit 204b will be described below.

Figure 5:
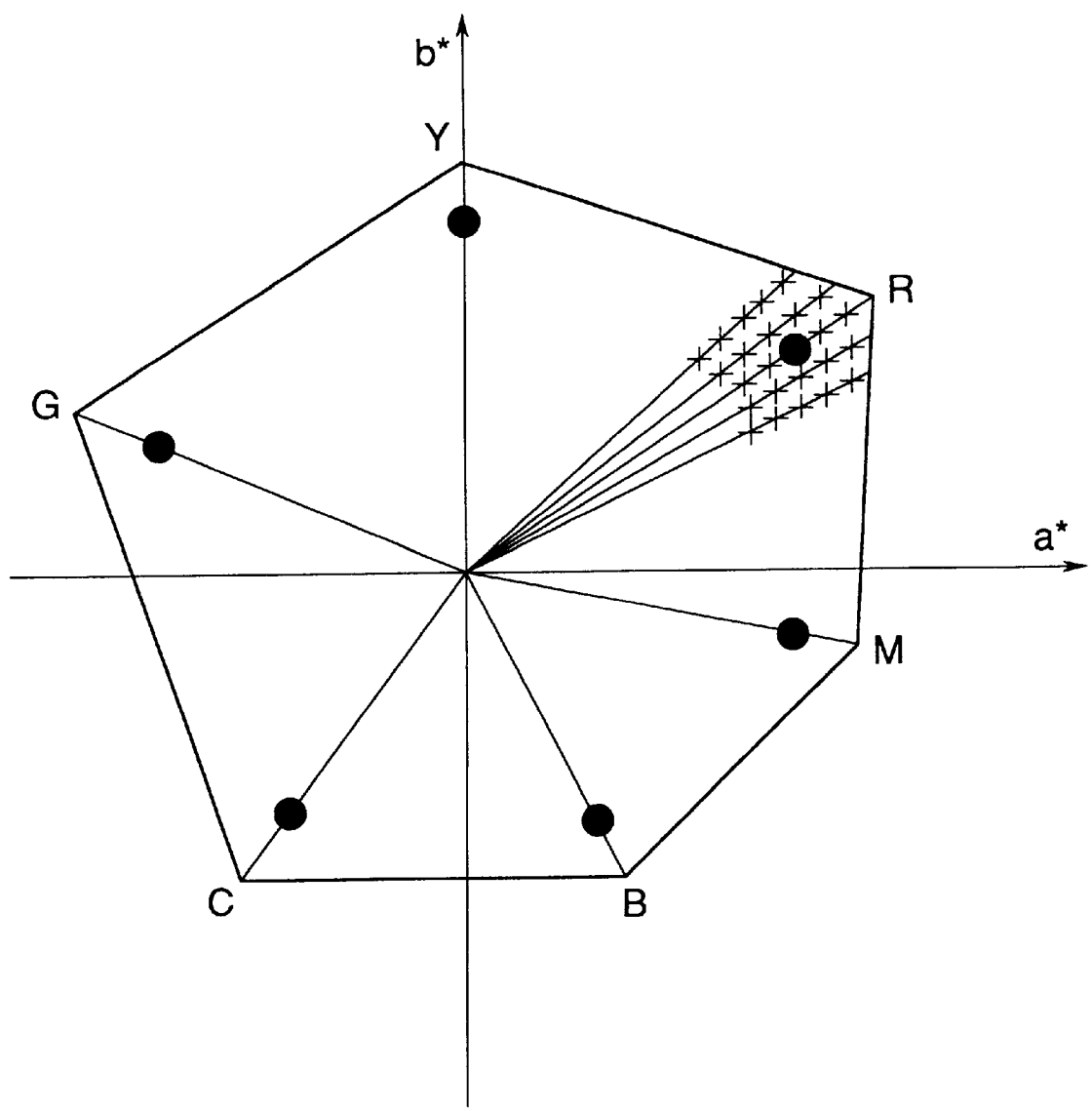
FIG. 5 is a graph showing examples of color coordinates in a uniform color space, which correspond to individual color adjustment keys of the operation unit of the present invention.

FIG. 5 is a graph in which the color reproduction range of the printer 210 of the color copying machine according to this embodiment is plotted in the L*a*b* uniform color space. In this color space, the color coordinate point of the reference set value of the color adjustment operation unit discussed above is determined for each of Y, M, C, R, G, and B (color coordinate points indicated by "crosshatched" circles in FIG. 5). Subsequently, color coordinate points corresponding to the adjustment steps equally spaced are determined for each reference set value in each of the hue direction and the saturation direction.

In the operation unit 211 in FIG. 2, the adjustment keys in ±2 steps are provided in each of the hue and saturation directions. Therefore, color coordinate points in ±2 steps centered at the color coordinate point indicated by the "crosshatched" circle are indicated by "x" in FIG. 5 (note that in FIG. 5, the arrangement is exactly the same for the individual colors, so only the arrangement of R is illustrated and detailed arrangements of Y, M, B, C, and G are omitted).

Assuming, as described above, that the color coordinate point of the reference set value is $(L^*_0 a^*_0 b^*_0)$, that the color coordinate point of the adjustment value (x) is $(L^*_i a^*_i b^*_i)$, and that the set color coordinate point of the adjusted color $(L^*_i a^*_i b^*_i)$ is $(L^{*'} a^{*'} b^{*'})$, $(L^*_0 a^*_0 b^*_0)$ and $(L^{*'} a^{*'} b^{*'})$ are converted in color coordinates into the R, G, and B signals in accordance with the following equations:

$$X = X_o * [(L^* + 16)/116 + a^*/500]^3 \quad (3)$$
$$Y = Y_o * [(L^* + 16)/116]^3$$
$$Z = Z_o * [((L^* + 16)/116 + b^*/200])^3$$

$$\begin{bmatrix} R \\ G \\ B \end{bmatrix} = \begin{bmatrix} 1.9106 & -0.5326 & -0.2883 \\ -0.9843 & 1.9984 & -0.0283 \\ 0.0584 & -0.1185 & 0.9895 \end{bmatrix} \begin{bmatrix} X \\ Y \\ Z \end{bmatrix} \quad (4)$$

The above arithmetic operations are performed for the six colors, i.e., Y, M, C, R, G, and B.

For a color not to be adjusted, $(L^{*'} a^{*'} b^{*'}) = (L^*_0 a^*_0 b^*_0)$.

One example of the correspondence between signals $(R_0 G_0 B_0)$ and (R'G'B') when the reference color $(L^*_0 a^*_0 b^*_0)$ and the adjusted color $((L^{*'} a^{*'} b^{*'})$ are converted into R, G, and B as discussed above is given below.

$(R_0 \ G_0 \ B_0) \rightarrow (R' \ G' \ B')$

Y: (255 250 10) → (255 250 10)

M: (200 10 90) → $(R_m' \ G_m' \ B_m')$

C: (10 95 200) → (10 95 200) \quad (5)

R: (160 20 10) → $(R_r' \ G_r' \ B_r')$

G: (20 100 20) → $(R_g' \ G_g' \ B_g')$

B: (15 10 100) → (15 10 100)

The above correspondence is an example when the adjustment discussed earlier is performed, i.e., when the adjustment is performed to "(1) increase the brightness and vividness of red without changing its hue, (2) increase the saturation of magenta without changing its hue and lightness, and (3) shift the hue of green toward blue without changing its lightness and saturation".

An example of the adjustment for the terms of R in this case will be described below.

When an operator wishes to "increase the brightness and vividness of red without changing its hue", he or she selects the "crosshatched" keys on the operation unit illustrated in FIG. 2. In accordance with the keys selected on the operation unit, the matrix coefficient generation unit 204b sets (Rr'Gr'Br'), which corresponds to adjustment amounts related to the adjustment amounts for the terms of R and is obtained by increasing the value of R without changing the ratio of ($R_0G_0B_0$), as (R'G'B'). Likewise, the matrix coefficient generation unit 204b sets (Rm'Gm'Bm') and (Rg'Gg'Bg'), as (R'G'B'), for the terms of M and G, respectively, and also sets ($R_0G_0B_0$)=(R'G'B') for (Y, C, and B) other than R, M, and G.

Substituting the above relationship between ($R_0G_0B_0$) and (R'G'B') for (RGB) and (R'G'B') in equations (1) and (2) yields 18 simultaneous linear equations. Since the number of $a_{ij}$'s as unknowns is also 18, these equations can be solved uniquely. Consequently, the matrix coefficient generation unit 204b determines and transfers the matrix conversion coefficients to the color conversion unit 204a.

In the first embodiment as described above, the operation unit 211 is so designed as to be able to designate adjustment in a uniform color space, and this adjustment is realized by performing matrix conversion for R, G, and B signals. This makes it possible to effectuate fine color adjustment with a simple hardware arrangement. Additionally, the six primary colors, i.e., Y, M, C, R, G, and B, can be effectively adjusted independently of each other.

In the above first embodiment, CIE-L*a*b* is used as the uniform color space. However, a similar effect can be obtained by using another uniform color space. Possible examples are CIE-L*u*v*, a Mansell notation system, and a DIN calorimetric system. When any of these systems is to be used, it is only necessary to use an equation or correspondence table for the conversion from the system into R, G, and B signals, in place of equations (3) and (4).

Second Embodiment

The second embodiment of the present invention will be described below with reference to the accompanying drawings, in which it is possible to simultaneously perform surface level correction, color space compression, and dark level correction for a color hard copy by using matrix conversion.

Figure 6:
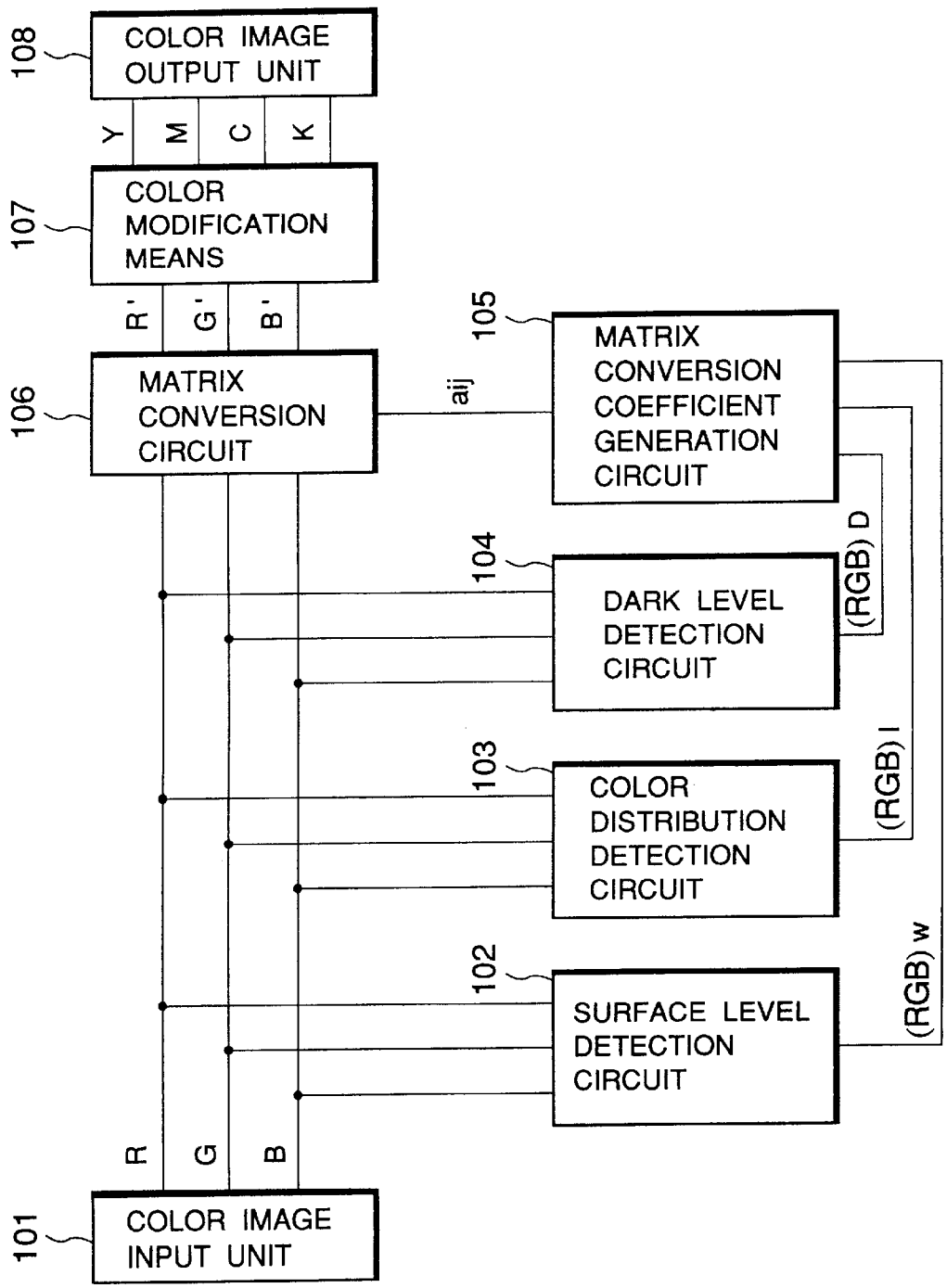
FIG. 6 is a block diagram showing the arrangement of the third embodiment according to the present invention.

FIG. 6 is a block diagram showing the arrangement of the second embodiment according to the present invention. Referring to FIG. 6, a color image input unit 101 comprises, e.g., an image signal input unit for receiving image signals from a reader unit of a color copying machine or from an external image input apparatus. The color image input unit 101 outputs R, G, and B color image color-separated signals.

The R, G, and B signals from the color image input unit 101 are first applied to a surface level detection circuit 102. The surface level detection circuit 102 performs detection in accordance with a detection method using a histogram. This circuit includes, as detection elements, a means for detecting gray highlight, and a means for determining that this gray-highlight signal occupies a predetermined area or more in order to check whether the signal indicates the surface or a portion of an image.

The surface level detected by the surface level detection circuit 102 is output as R, G, and B signals $R_wG_wB_w$=(RGB)$_w$.

The R, G, and B color image original signals are also input to a color distribution detection circuit 103. The color distribution detection circuit 103 detects, as the color distribution of the color image, a color signal with the highest saturation, i.e., the outermost color, from color signals of the color image original which fall outside the color reproduction range of the color image output unit. This detection is performed for each of the primary colors (R, G, B, C, M, and Y). The color distribution detected by the circuit 103 is output in the form of $$(RGB)_R(RGB)_G(RGB)_B(RGB)_C(RGB)_M(RGB)_Y=(RGB)_l$$

where l=1 to 6 for the primary colors.

Note that the color distribution detected by the color distribution detection circuit 103 is not limited to that detected for the six primary colors as mentioned above but may be detected for the combination of other colors as objects to be detected. For example, the color distribution can be detected for three colors as R, G, and B or for seven colors including another color, such as orange, as an object to be detected, in addition to the six primary colors.

Furthermore, the color to be detected from the colors of interest is not limited to the outermost color but may be a substantially outermost color.

The R, G, and B color image signals are also applied to a dark level detection circuit 104. This dark level detection circuit 104 detects, as a dark level, the minimum one of pixels in which all of R, G, and B are predetermined fixed values $R_{PD}$, $G_{PD}$, and $B_{PD}$ or less, for example:

$$R<R_{PD},\ G<G_{PD},\ \text{and}\ B<B_{PD}$$

The values $R_{PD}$, $G_{PD}$, and $B_{PD}$ represent the R, G, and B signal values, respectively, of the blackest one of colors to be reproduced by a color image output unit 108.

The dark level detected by the detection circuit 104 in this way is output in the form of (RGB)$_D$.

The outputs from the above three circuits 102, 103, and 104 are input to a matrix conversion coefficient generation circuit 105. From these outputs, the circuit 105 generates matrix conversion coefficients $a_{ij}$ for a matrix conversion circuit 106 and outputs the coefficients to the circuit 106. The matrix conversion circuit 106 performs matrix conversion in accordance with these matrix conversion coefficients $a_{ij}$. The result of the matrix conversion is desirably modified in colors by a color modification means 107 and output as an image from the color image output unit 108.

Figure 7:
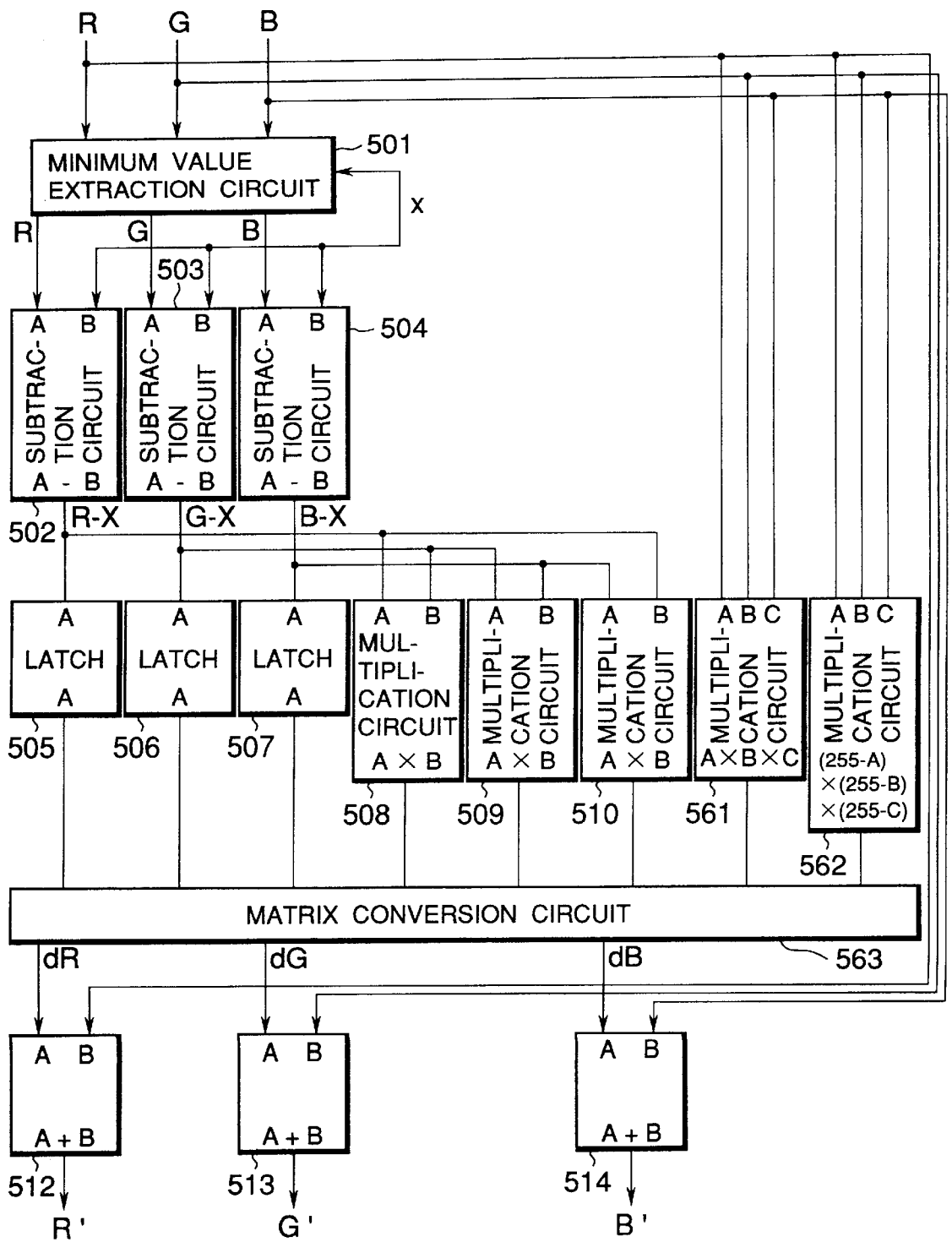
FIG. 7 is a block diagram showing details of a matrix conversion circuit in FIG. 6.

FIG. 7 shows a detailed arrangement of the matrix conversion circuit 106. Referring to FIG. 7, the same reference numerals as in the color conversion unit 204a serving as the matrix conversion circuit of the first embodiment illustrated in FIG. 4 denote the same parts, and a detailed description thereof will be omitted.

Input color image signals R, G, and B are sequentially transferred and processed together with drive clocks and reset signals (not shown).

In FIG. 7, a multiplication circuit 561 calculates the product of R, G, and B and outputs R*G*B. A multiplication circuit 562 calculates the product of the inverted signals of R, G, and B. If image data consists of eight bits (0 to 255), the multiplication circuit 562 outputs (255-R)*(255-G)* (255-B).

A matrix conversion circuit 563 performs matrix conversion for the eight signal values obtained as described above. More specifically, the matrix conversion circuit 563 performs the arithmetic operation represented by equation (6) below and outputs dR, dG, and dB:

$$\begin{bmatrix} dR \\ dG \\ dB \end{bmatrix} = \begin{bmatrix} a_{11} & a_{12} & a_{13} & a_{14} & a_{15} & a_{16} & a_{17} & a_{18} \\ a_{21} & a_{22} & a_{23} & a_{24} & a_{25} & a_{26} & a_{27} & a_{28} \\ a_{31} & a_{32} & a_{33} & a_{34} & a_{35} & a_{36} & a_{37} & a_{38} \end{bmatrix} \quad (6)$$

-continued $$\begin{bmatrix} R-X \\ G-X \\ B-X \\ (R-X)\cdot(G-X) \\ (G-X)\cdot(B-X) \\ (B-X)\cdot(R-X) \\ R\cdot G\cdot B \\ (255-R)(255-G)(255-B) \end{bmatrix}$$

The matrix conversion coefficients $a_{ij}$ used in the above equation are obtained by the method to be described later.

Adders 512, 513, and 514 add dR, dG, and dB obtained by equation (6) to the original R, G, and B signals and output color-separated signals R', G', and B' after the conversion. That is, the adders 512, 513, and 514 execute equation (7) below:

$$\begin{bmatrix} R' \\ G' \\ B' \end{bmatrix} = \begin{bmatrix} R \\ G \\ B \end{bmatrix} + \begin{bmatrix} dR \\ dG \\ dB \end{bmatrix} \quad (7)$$

The method of obtaining the matrix conversion coefficients $a_{ij}$ in equation (6) according to the second embodiment will be described below.

Any of the eight types of 8*3=24 R, G, and B signals detected by the detection circuit discussed above is an image signal which falls outside the color reproduction range or in which the surface is fogged, if the signal is in tact output. In the second embodiment, therefore, colors as desired targets are made correspond to these signals.

In the following description, it is assumed, for example, that the surface levels of a color image original detected by the surface level detection circuit 102 are R=240, G=240, and B=235. Note that R'=255, G'=255, and B'=255 are originally ideal values as the white level.

In addition, assume that red with the highest saturation detected by the color distribution detection circuit 103 is a signal of R=200, G=15, and B=0. It is, however, also assumed that red with the highest saturation within the color reproduction range of a hard copy is normally a signal of R'=160, G'=20, and B'=10.

The purpose of the above matrix conversion is to map the output image signal from the detection circuit within the color reproduction range of a hard copy. Therefore, it is only necessary to convert the R, G, and B signals into R'G'B' by this matrix conversion.

When this correspondence is set for all of the eight colors, i.e., the white level (one color), the color space distribution (six colors as Y, M, C, R, G, and B), and the black level (one color), 24 simultaneous linear equations are obtained from equations (6) and (7). Since the number of the matrix coefficients $a_{ij}$ as unknowns is also 24, these equations can be solved uniquely, and in this way the matrix coefficients are determined. One example of the correspondence is presented below.

|         | Detection levels |           |         |   | Targets |          |          |                            | (8) |
|---------|-----------|-----------|---------|---|---------|----------|----------|----------------------------|-----|
| White   | :R = 240  | G = 240   | B = 235 | → = | R' = 255 | G' = 255 | B' = 255 | Surface detection          |     |
| Red     | :R = 200  | G = 15    | B = 0   | → = | R' = 160 | G' = 20  | B' = 10  | Color distribution detection |   |
| Green   | :R = 10   | G = 220   | B = 5   | → = | R' = 20  | G' = 100 | B' = 20  | Color distribution detection |   |
| Blue    | :R = 0    | G = 10    | B = 180 | → = | R' = 15  | G' = 10  | B' = 100 | Color distribution detection |   |
| Cyan    | :R = 10   | G = 180   | B = 220 | → = | R' = 10  | G' = 95  | B' = 200 | Color distribution detection |   |
| Magenta | :R = 230  | G = 10    | B = 190 | → = | R' = 200 | G' = 10  | B' = 90  | Color distribution detection |   |
| Yellow  | :R = 255  | G = 250   | B = 0   | → = | R' = 255 | G' = 250 | B' = 10  | Color distribution detection |   |
| Black   | :R = 3    | G = 3     | B = 3   | → = | R' = 8   | G' = 8   | B' = 8   | Dark level detection       |     |

By the above procedure, desired conversion operations are obtained for all of the surface level correction, the color space compression, and the dark level correction.

As one modification, it is also possible to simultaneously perform the surface level correction and the color space compression by using matrix conversion in which (255−R)(255−G)(255−B) and their coefficients $a_{18}$, $a_{28}$, and $a_{38}$ are omitted from equation (6).

Furthermore, as another modification, it is possible to simultaneously perform the dark level correction and the color space compression by using matrix conversion in which R·G·B and their coefficients $a_{17}$, $a_{28}$, and $a_{38}$ are omitted from equation (6).

According to the second embodiment of the present invention as described above, it is possible to perform the surface level correction, the color space compression, and the dark level correction simultaneously by using the matrix conversion. Since the individual correction operations have no influence on each other, high-quality images can be obtained. Additionally, the cost of the apparatus can be decreased because the image processing unit is only one matrix conversion circuit.

Note that the present invention is applicable to either a system constituted by a plurality of devices, or an apparatus including only one device.

Note also that the present invention is applicable to situations where the above object is achieved by supplying programs to a system or an apparatus.

Incidentally, in equation (1) of the first embodiment discussed earlier, the minimum value X is the minimum value of R, G, and B. Therefore, at least one of R−X, G−X, and B−X is zero, so at least three of the vectors of the six terms are necessarily zero.

In the third embodiment of the present invention, a circuit will be described in which multiplications for only none-zero terms are performed in multiplications for individual pixels, thereby decreasing the number of multipliers.

In the third embodiment to be described below, the present invention is applied to a color printer. However, the present invention is not limited to this embodiment but can be applied to another image processing apparatus such as a color copying machine or a color monitor.

Third Embodiment

Figure 8:
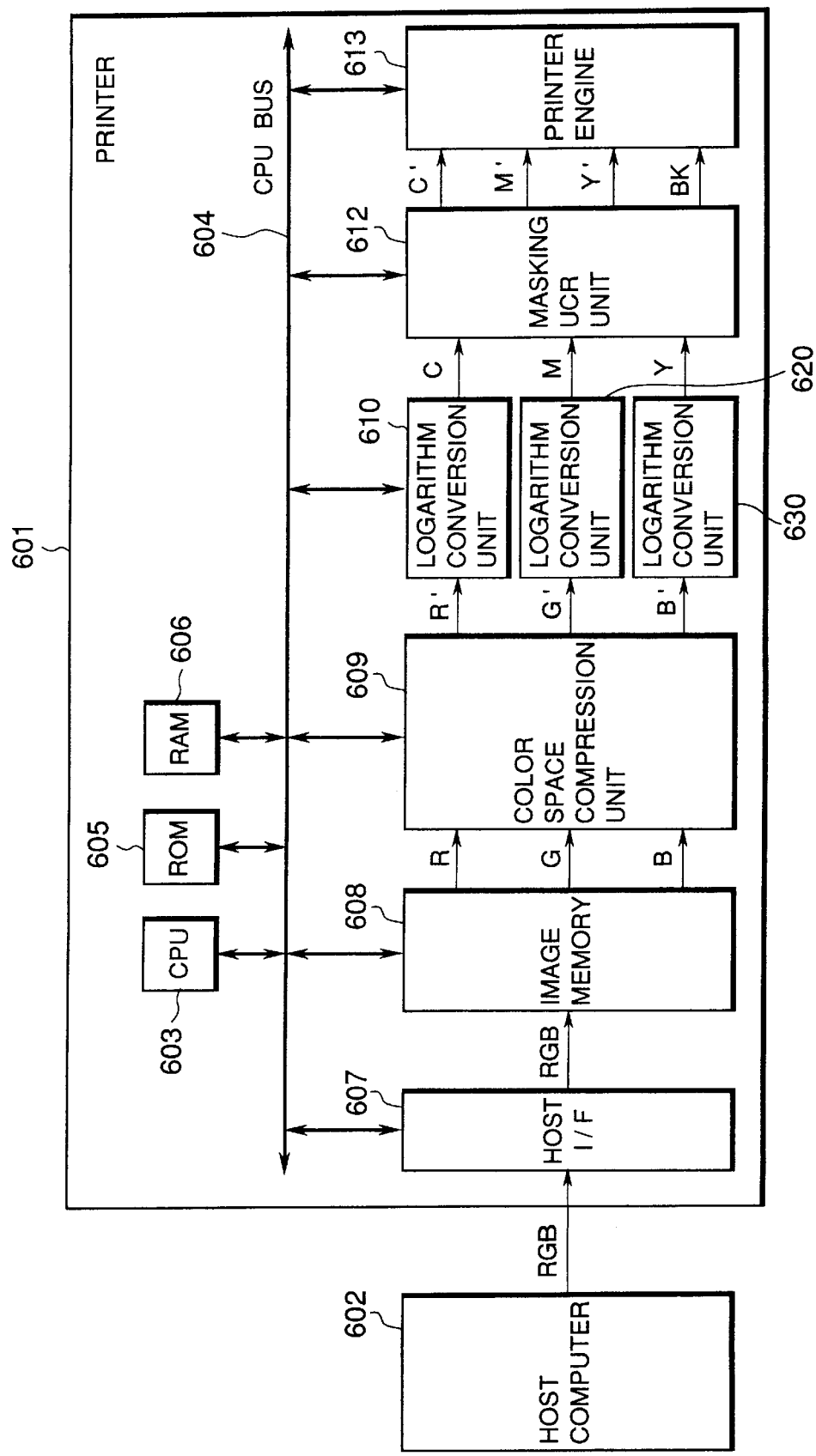
FIG. 8 is a block diagram showing the arrangement of a printer according to one embodiment of the present invention.

FIG. 8 is a block diagram showing the arrangement of a printer according to the third embodiment of the present invention.

Referring to FIG. 8, a printer 601 receives image data from a host computer 602. In this image data, one pixel consists of information of red R, green G, and blue B each having, e.g., eight bits. Note that the printer 601 can also be a color copying machine having an interface with a computer and capable of printing input images from the computer.

In the printer 601, a CPU 603 controls other parts (to be described later) in accordance with control programs stored in, e.g., a ROM 605. The CPU 603 also uses a RAM 606 as a work memory. The ROM 605, the RAM 606, and other parts (to be described later) are connected to the CPU 603 through a CPU bus 604 including address, data, and control buses.

The image data sent from the host computer 602 is received by a host interface (to be referred to as a "host I/F" hereinafter) 607 and written in an image memory 608. The image data stored in the image memory 608 is read out parallel in R, G, and B and applied to a color space compression unit 609 to be described in detail later.

The output image data R', G', and B' from the color space compression unit 609 are input to logarithm conversion units 610, 620, and 630 and converted into cyan C, magenta M, and yellow Y (each having, e.g., eight bits), respectively, of density image data.

The logarithm conversion units 610, 620, and 630 are constituted by three separate RAMs in which any given contents can be written from the CPU 603. That is, before the logarithm conversion units 610, 620, and 630 function as logarithm conversion units upon receiving image data, the CPU 603 writes logarithm conversion table data, which are stored in, e.g., the ROM 605 and correspond to the individual logarithm conversion units 610, 620, and 630, in the logarithm conversion units 610, 620, and 630. Thereafter, each logarithm conversion unit receives the image data at the address terminal of the RAM constituting that logarithm conversion unit, and outputs the data read out from the RAM as the density image data, thereby effectuating the logarithm conversion function.

The output image data from the logarithm conversion units 610, 620, and 630 are applied to a masking UCR unit 612. The masking UCR unit 612 extracts a black component Bk from the input C,M,Y image data and subtracts the value of this black component Bk from the input C,M,Y data, thereby outputting image data of C', M', Y', and Bk' each having, e.g., eight bits.

The C', M', Y', Bk' image data subjected to the above processing are applied to a printer engine 613 which in turn prints out an image represented by the input image data. Note that an electrophotographic type printer engine is assumed as the printer engine 613 in this embodiment, and a detailed description of the operation of the engine will be omitted since the operation is known well to those skilled in the art. Also, the printer engine 613 is not limited to the electrophotographic type printer engine but may be an ink jet type or heat sublimation type printer engine.

The color space compression unit 609 will be described below.

The color space compression unit 609 performs the arithmetic operation expressed by equation (1) mentioned earlier.

In equation (1), three out of the six terms in the R,G,B matrix operation are necessarily zero. Therefore, the purpose of this embodiment is to decrease the number of necessary multipliers, by changing objects to be calculated by the multipliers in accordance with the relationship of R, G, and B in size, without performing multiplications corresponding to the above three terms.

Figure 9:
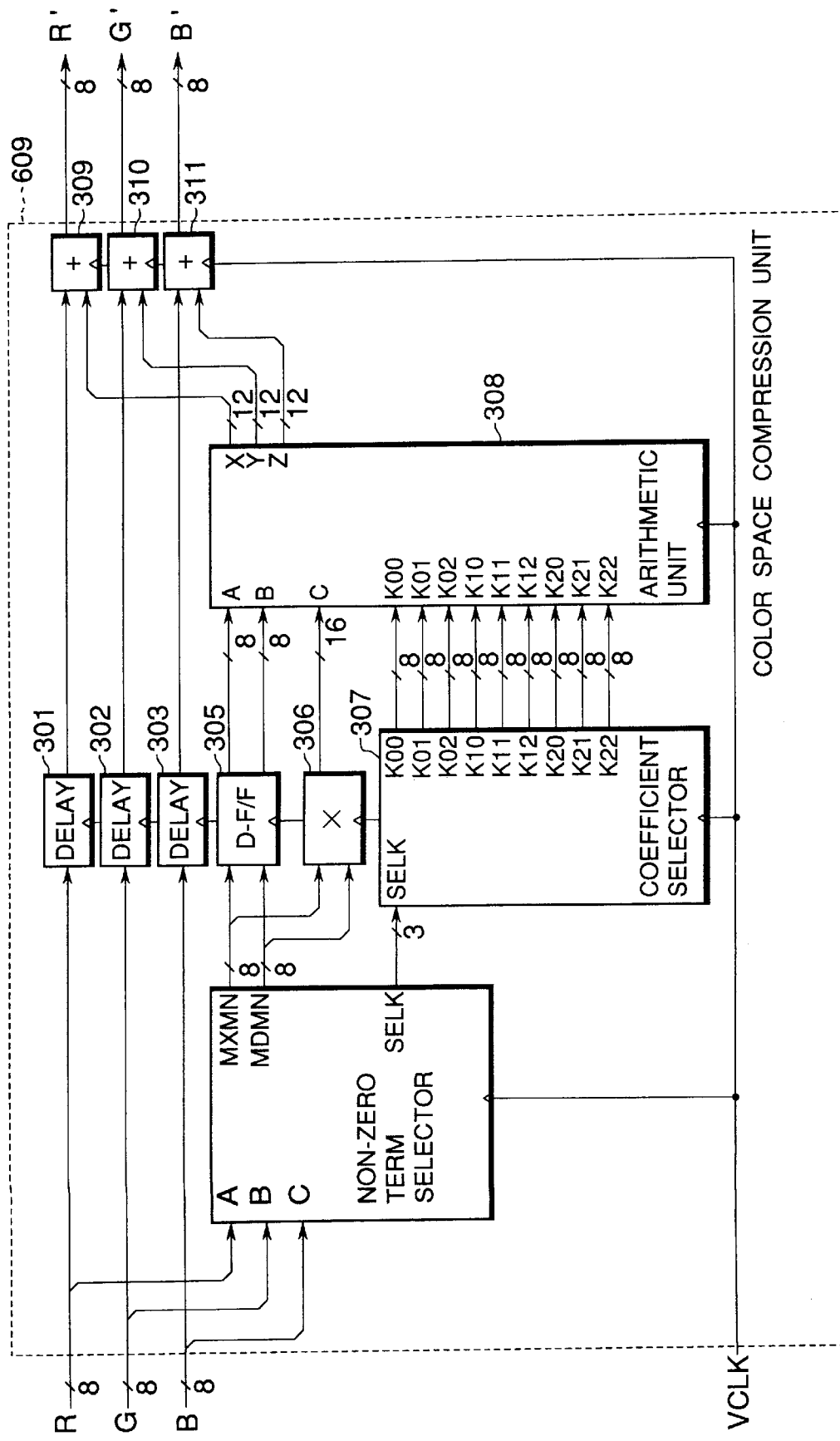
FIG. 9 is a block diagram showing a detailed arrangement of a color space compression unit in FIG. 8.

FIG. 9 is a block diagram showing a detailed arrangement of the color space compression unit 609.

Referring to FIG. 9, a non-zero term selector 304 receives image data and executes arithmetic operations given by equations (9) and (10) below, outputting signals MXMN and MDMN each consisting of, e.g., eight bits.

$$MXMN = max(A,B,C) - min(A,B,C) \qquad (9)$$

$$MDMN = med(A,B,C) - min(A,B,C) \qquad (10)$$

where A,B,C: input data max( ): an operation for obtaining a maximum value min( ): an operation for obtaining a minimum value med( ): an operation for obtaining a medium value (which is neither maximum nor minimum)

The non-zero term selector 304 also outputs, e.g., a 3-bit selection signal SELK as a signal representing which term is selected. FIG. 10 shows an example of the definition of the signal SELK, in which seven relationships of input data A, B, and C in size corresponding to the states of individual bits are illustrated. Note that there is no output of SELK="001". Therefore, it is possible to determine max(A,B,C), min(A,B,C), and med(A,B,C) on the basis of this signal SELK. It is also possible to select non-zero terms since min(A,B,C) is determined.

The output signals MXMN and MDMN from the non-zero term selector 304 are input to a multiplier 306, and the resulting product (MXMN×MDMN) of, e.g., 16 bits is input to an arithmetic unit 308. The selection signal SELK described above is input to a coefficient selector 307.

Figure 11:
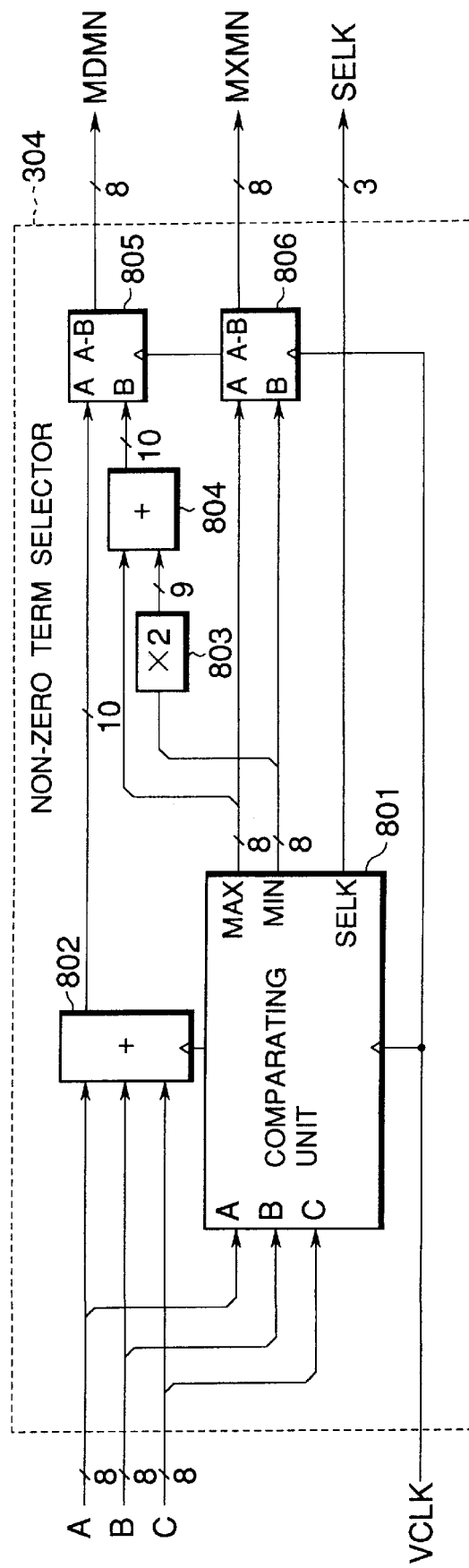
FIG. 11 is a block diagram showing a detailed arrangement of the non-zero term selector in FIG. 9.

FIG. 11 is a block diagram showing a detailed arrangement of the non-zero term selector 304.

Referring to FIG. 11, inputs A, B, and C are input to a 3-input adder 802 and a comparing unit 801. The comparing unit 801 outputs a maximum value MAX and a minimum value MIN of the inputs A, B, and C.

Figure 12:
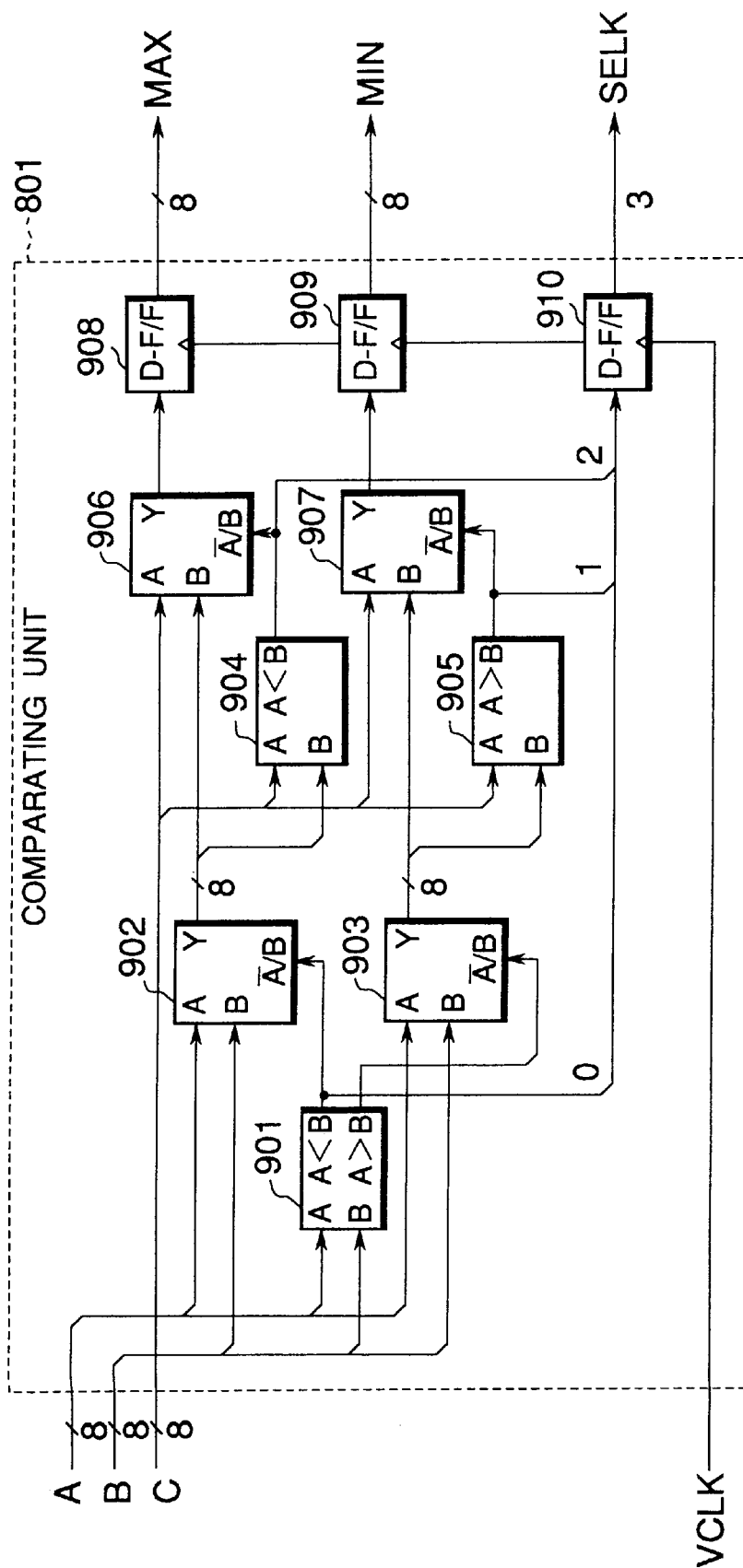
FIG. 12 is a block diagram showing a detailed arrangement of a comparing unit in FIG. 11.

FIG. 12 is a block diagram showing a detailed arrangement of the comparing unit 801. In FIG. 12, comparators 901, 904, and 905 determine the relationship of the inputs A, B, and C in size. Multiplexers 902 and 903 select and output one of the input data in accordance with the determination result from the comparator 901. Multiplexers 906 and 907 select and output one of the input data in accordance with the determination results from the comparators 904 and 905, respectively.

D flip-flops (to be referred to as "D-F/Fs" hereinafter) 908 and 909 latch the outputs from the multiplexers 906 and 907, respectively, in synchronism with a clock VCLK. In this case, the output from the D-F/F 908 is the maximum value MAX, and the output from the D-F/F 909 is the minimum value MIN.

A D-F/F 910 latches the output A<B from the comparator 901, the output A>B from the comparator 905, and the output A<B from the comparator 904 in synchronism with the clock VCLK. In this case, the output from the D-F/F 910 is the signal SELK in which the 0th bit is the output A<B from the comparator 901, the first bit is the output A>B from the comparator 905, and the second bit is the output A<B from the comparator 904.

Referring back to FIG. 11, the outputs MAX and MIN from the comparing unit 801 are applied to a subtracter 806, and the subtracter 806 outputs the difference (MAX−MIN) as the signal MXMN. Also, the output MIN is doubled by a block 803 and applied together with the output MAX to an adder 804. Note that the block 803 performs an arithmetic operation of doubling an input; that is, the block 803 shifts the individual bits of an input by one bit to the respective upper bit positions, and inserts '0' in the position of a least significant bit LSB.

The output (MAX+2MIN) from the adder 804 and the output (A+B+C) from the adder 802 are applied to a subtracter 805. The subtracter 805 outputs the difference (A+B+C−MAX−2MIN) as the signal MDMN. This MDMN is calculated by using the relationship between equations (11) and (12) below:

$$A+B+C=MAX(A,B,C)+MED(A,B,C)+MIN(A,B,C) \quad (11)$$

Therefore, $$A+B+C-\{MAX(A,B,C)+2\times MIN(A,B,C)\}=MAX(A,B,C)+MED(A,B,C)+MIN(A,B,C)-\{MAX(A,B,C)+2\times MIN(A,B,C)\}=MED(A,B,C)-MIN(A,B,C) \quad (12)$$

Referring back to FIG. 9, the coefficient selector 307 selects internal coefficient registers in accordance with the input signal SELK, and outputs nine coefficients K00, K01, K02, K10, K11, K12, K20, K21, and K22 each consisting of, e.g., eight bits to the arithmetic unit 308.

Figure 13:
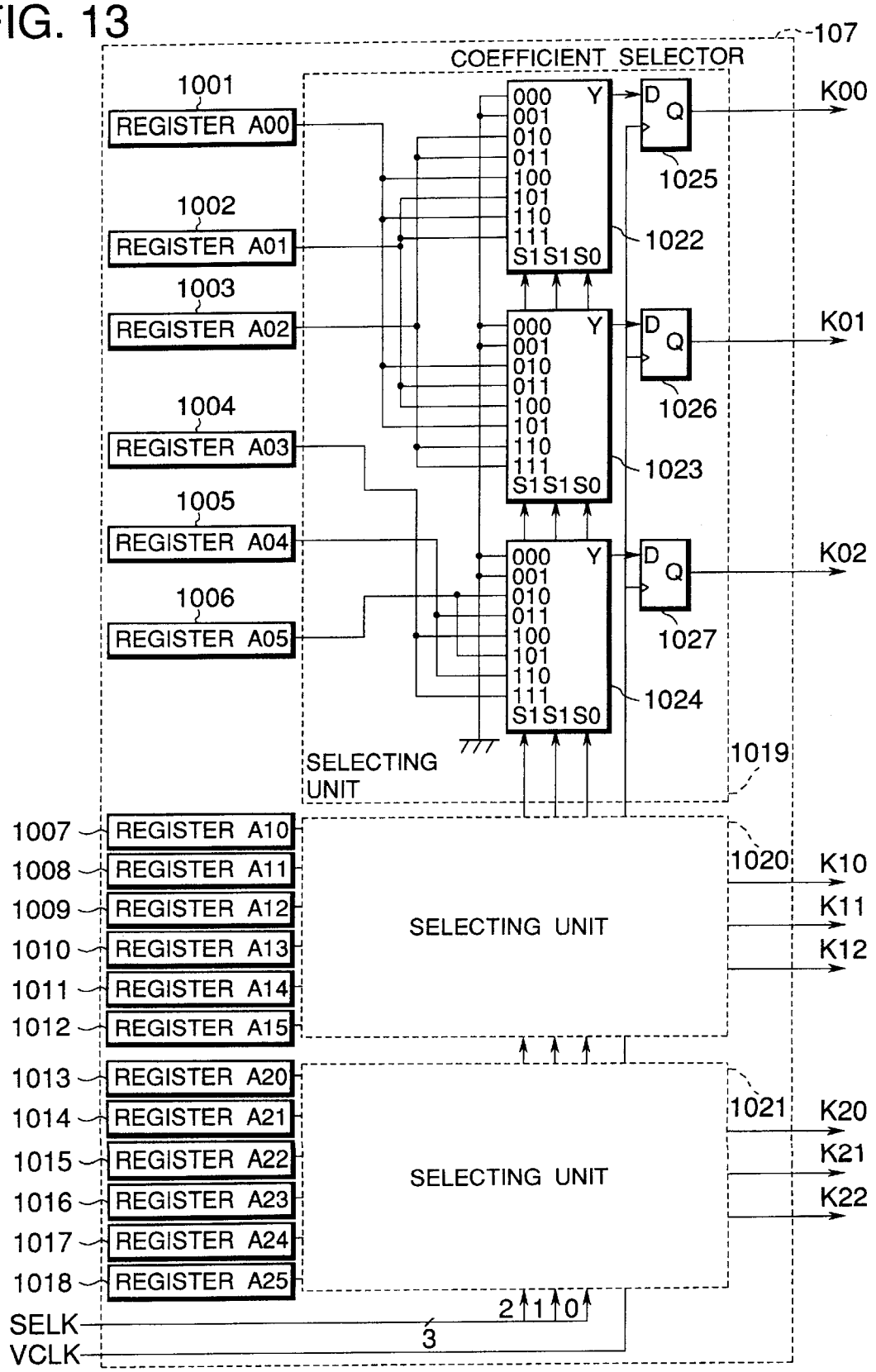
FIG. 13 is a block diagram showing a detailed arrangement of a coefficient selector in FIG. 9.

FIG. 13 is a block diagram showing a detailed arrangement of the coefficient selector 307.

Referring to FIG. 13, coefficients are stored in 18 coefficient resistors 1001 to 1018.

A selecting unit 1019 selects any three of the coefficient registers 1001 to 1006 in accordance with the signal SELK to output the coefficients K00, K01, and K02. A selecting unit 1020 selects any three of the coefficient registers 1007 to 1012 in accordance with the signal SELK to output the coefficients K10, K11, and K12. A selecting unit 1021 selects any three of the coefficient registers 1013 to 1018 in accordance with the signal SELK to output the coefficients K20, K21, and K22. Note that each of the selecting units 1019 to 1021 is constituted by three multiplexers 1022 to 1024 and D-F/Fs 1025 to 1027 for outputting the selected coefficients in synchronism with the clock VCLK.

Referring back to FIG. 9, the arithmetic unit 308 receives the signals MXMN and MDMN at input terminals A and B, respectively, via the D-F/F 105, and the output (MXMN× MDMN) from the multiplier 306 at an input terminal C, performing arithmetic operations given by equations (13), (14), and (15) below and outputting the three operation results each consisting of, e.g., 12 bits:

$$X=(A\times K00+B\times K01+C\times K02/a)/b \quad (13)$$

$$Y=(A\times K10+B\times K11+C\times K12/a)/b \quad (14)$$

$$Z=(A\times K20+B\times K21+C\times K22/a)/b \quad (15)$$

In the above equations, the term relating to the input C is divided by a constant a and the result in the parentheses is further divided by a constant b, since integer values obtained by multiplying actual coefficients by the constant b (e.g., 64) are set as the coefficients Ki0 and Ki1 (i=0, 1, or 2) in the registers, and an integer value obtained by multiplying an actual coefficient by the constant a×b (e.g., 256×64=16,384) is set as the coefficient Ki2 (i=0, 1, or 2) in the register.

Figure 14:
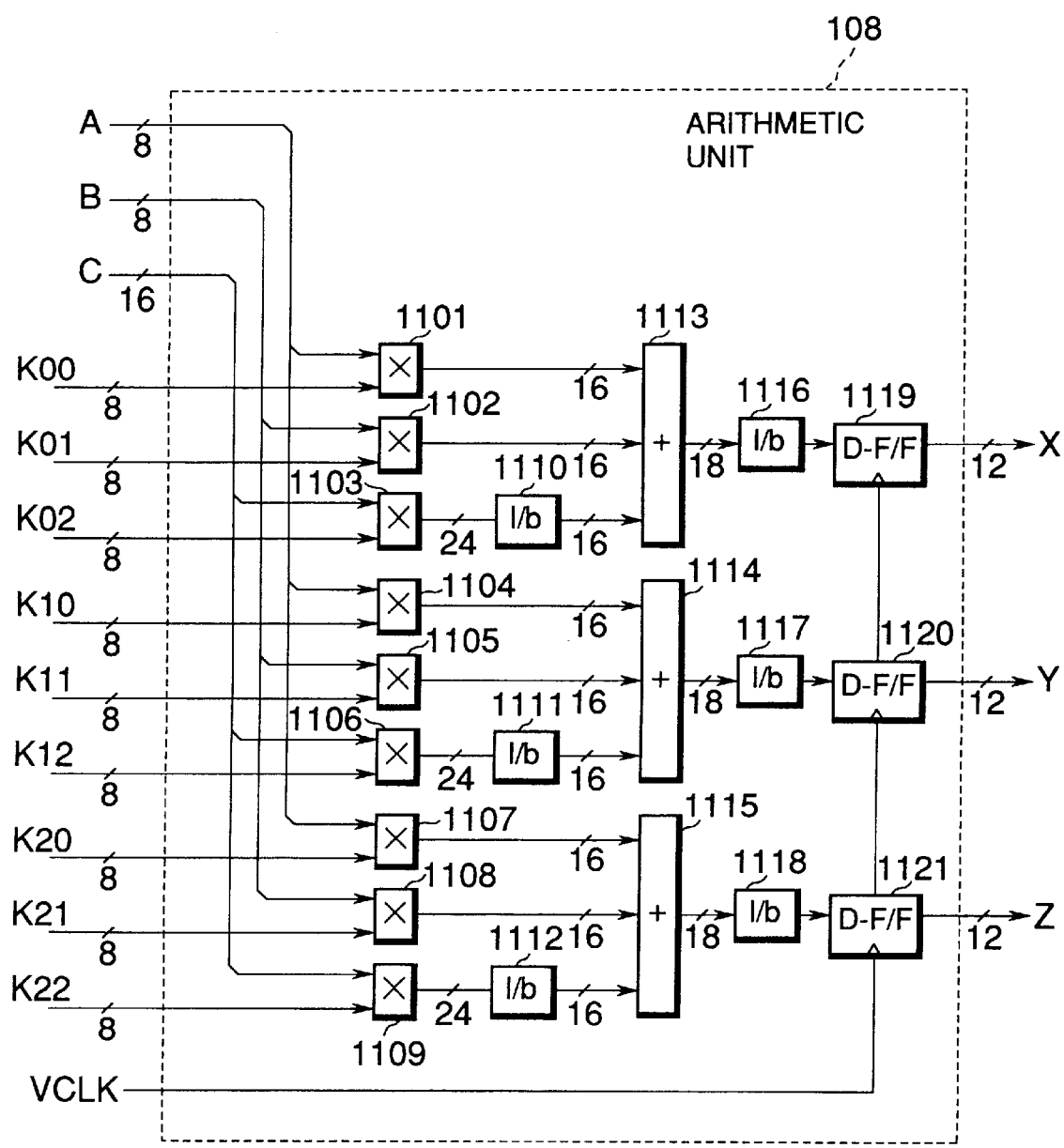
FIG. 14 is a block diagram showing a detailed arrangement of an arithmetic unit in FIG. 9.

FIG. 14 is a block diagram showing a detailed arrangement of the arithmetic unit 308. Referring to FIG. 14, the arithmetic operations given by equations (13) to (15) are realized by multipliers 1101 to 1109, dividers 1110 to 1112, adders 1113 to 1115, and dividers 1116 to 1118. D-F/Fs 1119 to 1121 output the operation results in synchronism with the clock VCLK.

Referring back to FIG. 9, the R, G, and B data applied to the color space compression unit 609 are adjusted in timing by delays 301 to 303 and added to the three outputs from the arithmetic unit 308 by adders 309 to 311. The resultant sums (R+X, G+X, and B+X) are the output image data R', G', and B' of the color space compression unit 609. In this case, the adders 309 to 311 add the positive integers of, e.g., eight bits from the delays 301 to 303 to the coded integers of, e.g., 12 bits from the arithmetic unit 308. Each adder includes a limiter which outputs zero if the sum is zero or less, and a predetermined value (255 in the case of eight bits) if the sum is the predetermined value or more.

According to this embodiment as discussed above, the color space compression unit 609 requires ten multipliers in total, i.e., the multiplier 306 and the nine internal multipliers of the arithmetic unit 308. That is, the number of multipliers can be reduced compared with those in conventional systems.

Fourth Embodiment

An image processing apparatus according to the fourth embodiment of the present invention will be described below. In the fourth embodiment, the same reference numerals as in the third embodiment denote the same parts, and a detailed description thereof will be omitted.

In the above third embodiment, the R, G, and B image data each consisting of eight bits (24 bits total) are transferred in synchronism with the clock VCLK. In this fourth embodiment, however, a signal line having, e.g., an 8-bit width is used to time-divisionally transfer the 8-bit image data R, G, and B.

Figure 15:
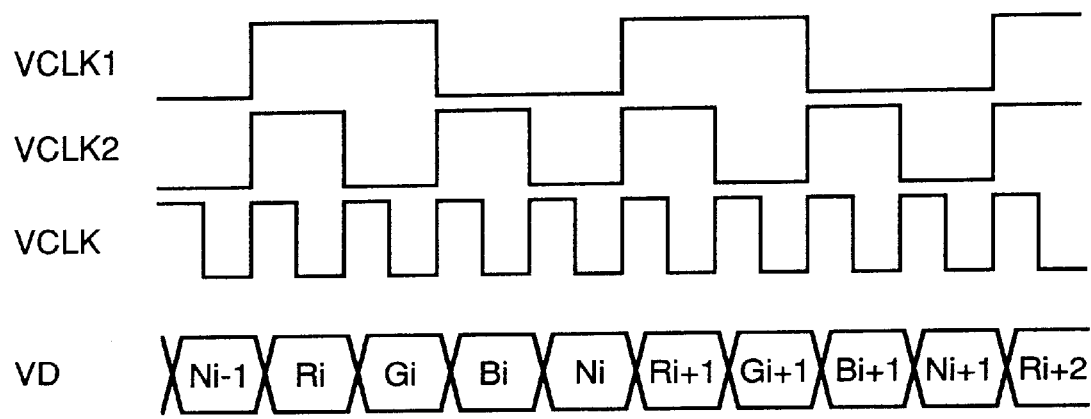
FIG. 15 is a timing chart showing the relationship between the image data and the sync signals according to the fifth embodiment of the present invention.

FIG. 15 is a timing chart showing the relationship between image data and sync signals according to the fourth embodiment. Referring to FIG. 15, image data VD is transferred time-divisionally in an order of, e.g., R, G, B, and N in synchronism with a clock VCLK. In FIG. 15, N represents undefined data, and each bit of this data N can be used as a switching signal in black character emphasizing processing. Also, sync signals VCLK1 and VCLK2 are used in addition to the signal VCLK. One period of the signal VCLK1 represents one pixel, and two periods of the signal VCLK2 represent one pixel. These three sync signals VCLK, VCLK1, and VCLK2 are synchronized with one another.

Figure 16:
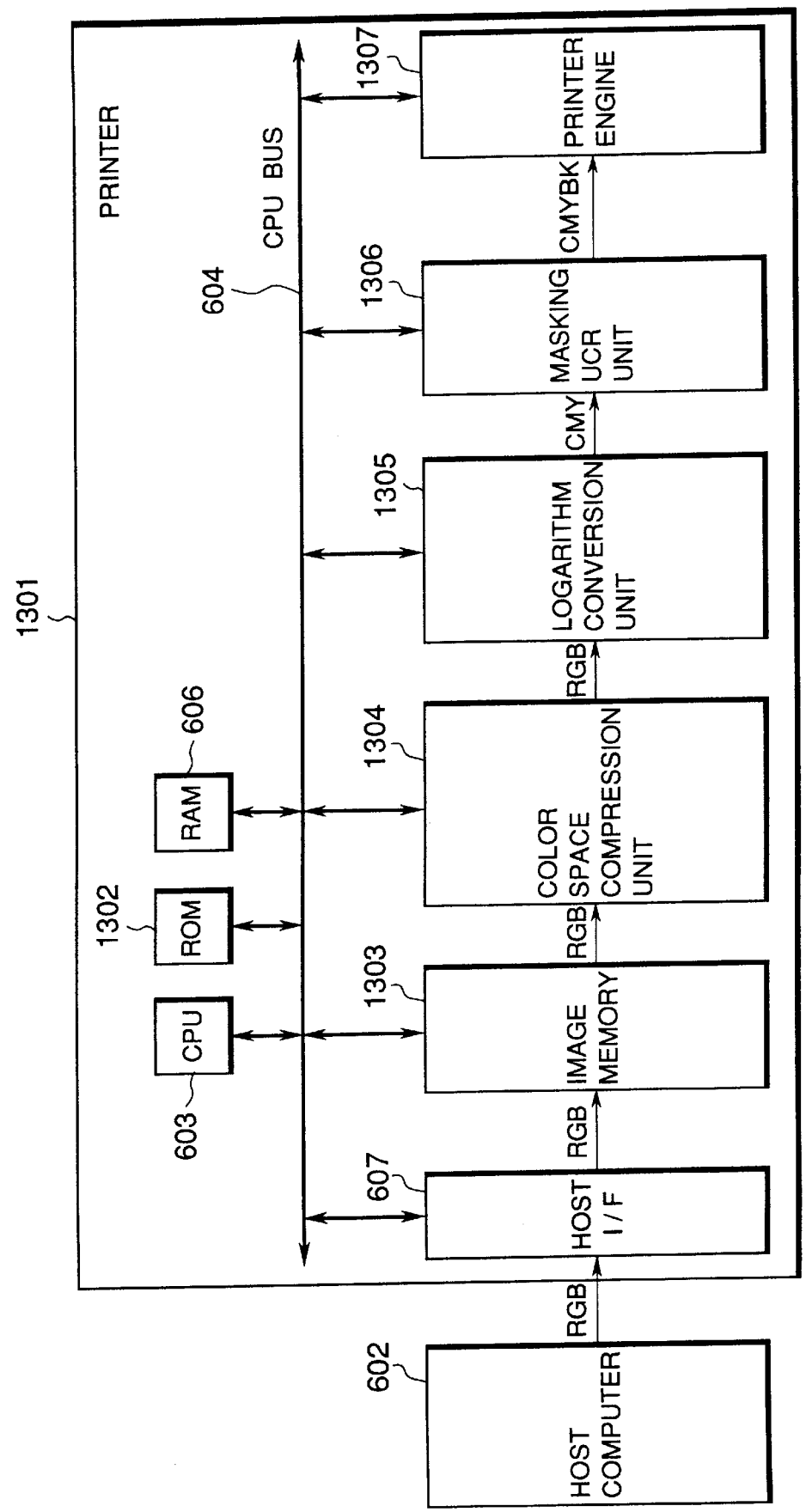
FIG. 16 is a block diagram showing the arrangement of a printer according to the fifth embodiment.
Figure 17:
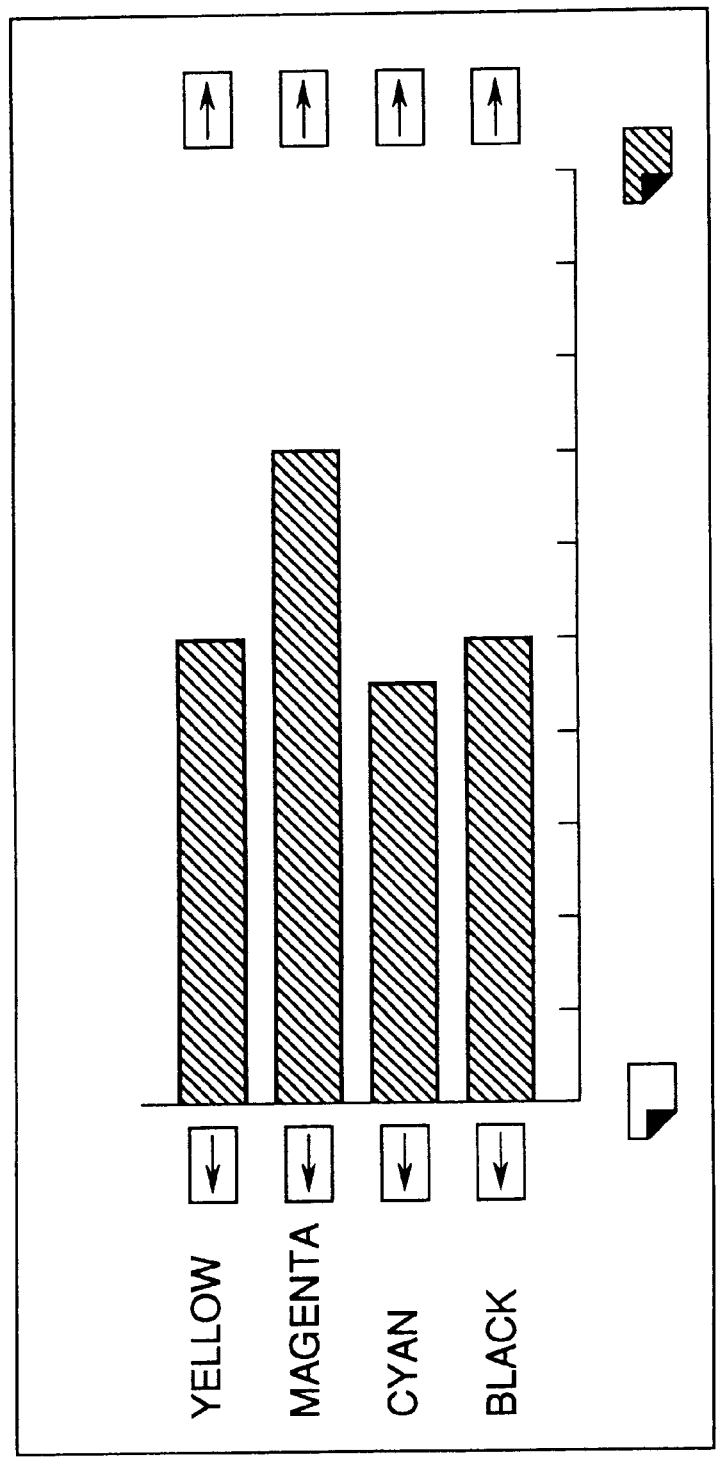
FIG. 17 is a view showing the arrangement of a conventional color adjustment operation unit.

FIG. 16 is a block diagram showing the arrangement of a printer of the fourth embodiment.

Referring to FIG. 16, a printer 1301 receives image data from a host computer 602. An internal CPU 603 of the printer 1301 controls other components in accordance with control programs stored in, e.g., a ROM 1302.

The image data sent from the host computer 602 is received by a host I/F 607 and written in an image memory 1303. The image data stored in the image memory 1303 is read out in an order of R, G, and B and applied to a color space compression unit 1304 for performing the arithmetic operation given by equation (1) as in the third embodiment.

The image data output in an order of R', G', and B' from the color space compression unit 1304 are applied to a logarithm conversion unit 1035 and output in an order of density image data C, M, and Y.

The logarithm conversion unit 1305 is constituted by a RAM in which given contents can be written from the CPU 603. That is, before the logarithm conversion unit 1305 functions as a logarithm conversion unit upon receiving image data, the CPU 603 writes logarithm conversion unit table data, which is stored in, e.g., the ROM 605, in the logarithm conversion unit 1305. Thereafter, the logarithm conversion unit 1305 receives the image data at the address terminal of the RAM constituting the logarithm conversion unit, and outputs the data read out from the RAM as the density image data, thereby effectuating the logarithm conversion function.

The output image data in the order of C, M, and Y from the logarithm conversion unit 1305 are input to a masking UCR unit 1306. The masking UCR unit 1306 extracts a black component Bk from the input C,M,Y image data, and subtracts the value of this black component Bk from the input C,M,Y data, thereby outputting image data C', M', Y', and Bk each consisting of, e.g., eight bits.

The image data C', M', Y', and Bk subjected to the above processing are applied in this order to a printer engine 1037 which in turn prints out an image represented by the input image data. Note that an ink-jet type printer engine is assumed as the printer engine 1307 in this embodiment, and a detailed description of the operation of the engine will be omitted since the operation is known well to those skilled in the art. Also, the printer engine 1307 is not limited to the ink-jet type printer engine but may be an electrophotographic type or heat sublimation type printer engine.

The color space compression unit 1304, the logarithm conversion unit 1305, the masking UCR unit 1306, and the printer engine 1307 discussed above have substantially the same configurations as in the third embodiment. In addition, these units perform their respective necessary operations in accordance with the time division transfer of the image data; e.g., each unit receives VCLK1 and VCLK2 in addition to VCLK, temporarily stores data input in the order of R, G, and B or of C, M, Y, and Bk by using a buffer (not shown), and switches processing parameters for each color to be processed therein.

According to this embodiment as described above, it is possible to obtain the same effect as in the third embodiment, and to apply the present invention to an apparatus which time-divisionally transfers image data.

Fifth Embodiment

The color space compression unit discussed above is so designed as to perform the arithmetic operation of equation (1). However, the present invention is not limited to this arithmetic operation but is also applicable to the arithmetic operation of equation (6) in which terms of degree three are added to the six terms of equation (1).

Although details of this embodiment are not shown, at least three out of the eight terms are zero, so this embodiment also makes it possible to reduce the number of multipliers correspondingly.

As described above, an image processing apparatus can be provided in which non-zero terms are selected from an image signal consisting of a plurality of elements, a plurality of coefficients are generated in accordance with the selected terms, the selected terms and the coefficients are multiplied on the basis of a predetermined combination, and the products are added. Since, for example, only non-zero terms are multiplied in multiplications performed for each pixel, the number of multipliers can be reduced. Consequently, the scale of the circuit of the apparatus can be decreased, and its manufacturing cost can also be decreased.

The present invention can also be realized by using software. In this case, a detection step of detecting a term by which the product of the multiplication and addition is not zero is provided, and the operation is performed on the basis of this detection result.

By eliminating the arithmetic operation for non-zero terms in this way, the operation can be executed at a high speed.

Note that the present invention is applicable to either a system constituted by a plurality of devices or an apparatus including only one device.

Note also that the present invention is applicable to situations where the above object is achieved by supplying programs to a system or apparatus.

The present invention is not limited to the above embodiments but various modifications and applications of the invention can be made without departing from the scope of the claims.

What is claimed is:

1. An image processing apparatus comprising:

setting means for manually setting adjustment amounts;

generating means for generating matrix coefficients based on said set adjustment amounts and on color gamut data of an image forming unit relating to each of plural representative colors; and color processing means for performing matrix conversion to convert a color image signal based on the matrix coefficients, wherein the setting means comprises:

(a) a first setting unit for setting adjustment amounts for hue and saturation with respect to the plural representative colors using a displayed graph having coordinates for hue and saturation, wherein each of the plural representative colors is independently adjustable with respect to hue and saturation; and (b) a second setting unit for setting adjustment amounts for lightness with respect to each of the plural representative colors, wherein each of the plural representative colors is independently adjustable with respect to lightness.

2. An apparatus according to claim 1, further comprising reading means for reading an original image to generate the color image data; and image forming means for forming a color image based on color image data which has been color processed by the color processing means.

3. An image processing apparatus according to claim 1, wherein said plural representative colors include red, green, blue, cyan, magenta and yellow.

4. An image processing apparatus according to claim 1, wherein the first setting unit sets the adjustment amounts for hue and saturation by using a color circle.

5. An image processing apparatus for performing arithmetic processing in which a zero term is present in a product when multiplication and addition of a plurality of coefficients are performed for an image signal composed of a plurality of elements, comprising:

selection means for selectively outputting a non-zero term of the image signal and outputting a selection signal representing the selected term;

coefficient means for outputting a plurality of coefficients in accordance with the output selection signal from said selection means;

a plurality of multiplication means for multiplying the output term from said selection means by a plurality of the output coefficients from said coefficient means in accordance with a predetermined combination; and addition means for adding products from a plurality of said multiplication means.

6. An apparatus according to claim 5, wherein the arithmetic processing is image processing for performing color space compression.

7. An apparatus according to claim 6, wherein the image signal is an RGB image signal.

8. An apparatus according to claim 7, wherein the image signal is transferred dot-sequentially in said apparatus.

9. An image processing method comprising:

a setting step for manually setting adjustment amounts;

a generating step for generating matrix coefficients based on said set adjustment amounts and on color gamut data of an image forming unit relating to each of plural representative colors; and a color processing step for performing matrix conversion to convert a color image signal based on the matrix coefficients, wherein the setting step comprises:

a first setting step for setting adjustment amounts for hue and saturation with respect to the plural representative colors using a displayed graph having coordinates for hue and saturation, wherein each of the plural representative colors is independently adjustable with respect to hue and saturation; and a second setting step for setting adjustment amounts for lightness with respect to each of the plural representative colors, wherein each of the plural representative colors is independently adjustable with respect to lightness.

10. A method according to claim 9, further comprising a reading step for reading an original image to generate the color image data; and an image forming step for forming a color image based on color image data which has been color processed in the color processing step.

11. An image processing method according to claim 9, wherein said plural representative colors include red, green, blue, cyan, magenta and yellow.

12. An image processing apparatus according to claim 9, wherein the first setting step sets the adjustment amounts for hue and saturation by using a color circle.

13. An image processing method for performing arithmetic processing in which a zero term is present in a product when multiplication and addition of a plurality of coefficients are performed for an image signal composed of a plurality of elements, comprising:

a selectively outputting step for selectively outputting a non-zero term of the image signal;

a first outputting step for outputting a selection signal representing the selected term;

a second outputting step for outputting a plurality of coefficients in accordance with the output selection signal from the selectively outputting step;

a multiplying step for multiplying the output term from the selectively outputting step by a plurality of the output coefficients from the second outputting step in accordance with a predetermined combination; and an addition step for adding products from the multiplying step.

14. A method according to claim 13, wherein the arithmetic processing is image processing for performing color space compression.

15. A method according to claim 14, wherein the image signal is an RGB image signal.

16. A method according to claim 15, wherein the image signal is transferred dot-sequentially in said method.

* * * * *